United States Patent
Karafin et al.

(10) Patent No.: US 11,668,869 B2
(45) Date of Patent: Jun. 6, 2023

(54) HOLOGRAPHIC SUPERIMPOSITION OF REAL WORLD PLENOPTIC OPACITY MODULATION THROUGH TRANSPARENT WAVEGUIDE ARRAYS FOR LIGHT FIELD, VIRTUAL AND AUGMENTED REALITY

(71) Applicant: LIGHT FIELD LAB, INC., San Jose, CA (US)

(72) Inventors: Jonathan Sean Karafin, San Jose, CA (US); Brendan Elwood Bevensee, San Jose, CA (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

(21) Appl. No.: 17/345,693

(22) Filed: Jun. 11, 2021

(65) Prior Publication Data

US 2021/0373231 A1    Dec. 2, 2021

Related U.S. Application Data

(63) Continuation of application No. 16/064,375, filed as application No. PCT/US2017/042462 on Jul. 17, 2017, now Pat. No. 11,073,657.
(Continued)

(30) Foreign Application Priority Data

Jul. 14, 2017    (WO) ............... PCT/US2017/042275
Jul. 14, 2017    (WO) ............... PCT/US2017/042276

(51) Int. Cl.
*G06F 3/01*    (2006.01)
*G02B 27/00*    (2006.01)
(Continued)

(52) U.S. Cl.
CPC ........... *G02B 6/0096* (2013.01); *G02B 6/023* (2013.01); *G02B 6/02042* (2013.01); *G02B 6/04* (2013.01);
(Continued)

(58) Field of Classification Search
None
See application file for complete search history.

(56) References Cited

U.S. PATENT DOCUMENTS 5,187,260 A    2/1993  Karali et al.
5,187,360 A    2/1993  Pasco
(Continued)

FOREIGN PATENT DOCUMENTS

CN    105637415 A    6/2016
JP    H10186275 A    7/1998
(Continued)

OTHER PUBLICATIONS

AU-2017296074 Notice of Acceptance dated Mar. 12, 2020.
(Continued)

*Primary Examiner* — Rhonda S Peace
(74) *Attorney, Agent, or Firm* — Charles C. Yang

(57) ABSTRACT

Disclosed are transparent energy relay waveguide systems for the superimposition of holographic opacity modulation states for holographic, light field, virtual, augmented and mixed reality applications. The light field system may comprise one or more energy waveguide relay systems with one or more energy modulation elements, each energy modulation element configured to modulate energy passing therethrough, whereby the energy passing therethrough may be directed according to 4D plenoptic functions or inverses thereof.

24 Claims, 12 Drawing Sheets

Related U.S. Application Data

(60) Provisional application No. 62/507,500, filed on May 17, 2017, provisional application No. 62/366,076, filed on Jul. 24, 2016, provisional application No. 62/362,602, filed on Jul. 15, 2016.

(51) Int. Cl.
| | |
|---|---|
| *G02B 27/09* | (2006.01) |
| *G02B 30/00* | (2020.01) |
| *G02B 30/33* | (2020.01) |
| *G02B 6/02* | (2006.01) |
| *G02B 6/04* | (2006.01) |
| *G02B 27/10* | (2006.01) |
| *G02B 6/293* | (2006.01) |
| *F21V 8/00* | (2006.01) |
| *H04N 13/388* | (2018.01) |
| *G02B 6/08* | (2006.01) |
| *G02B 27/01* | (2006.01) |
| *G02B 25/00* | (2006.01) |
| *G03H 1/22* | (2006.01) |
| *G02B 30/56* | (2020.01) |
| *H04N 5/89* | (2006.01) |
| *H04N 23/957* | (2023.01) |
| *G10K 11/26* | (2006.01) |
| *G21K 1/00* | (2006.01) |
| *G02B 3/00* | (2006.01) |
| *G02B 3/08* | (2006.01) |
| *H04N 13/344* | (2018.01) |
| *G02B 5/32* | (2006.01) |
| *G03H 1/02* | (2006.01) |
| *G03H 1/00* | (2006.01) |

(52) U.S. Cl.
CPC ........... *G02B 6/08* (2013.01); *G02B 6/29325* (2013.01); *G02B 27/0172* (2013.01); *G02B 27/0955* (2013.01); *G02B 27/0994* (2013.01); *G02B 27/1066* (2013.01); *G02B 30/00* (2020.01); *G02B 30/33* (2020.01); *H04N 13/388* (2018.05); *G02B 3/0056* (2013.01); *G02B 3/08* (2013.01); *G02B 5/32* (2013.01); *G02B 6/0229* (2013.01); *G02B 6/02295* (2013.01); *G02B 25/00* (2013.01); *G02B 25/002* (2013.01); *G02B 27/0093* (2013.01); *G02B 27/0103* (2013.01); *G02B 27/1073* (2013.01); *G02B 30/56* (2020.01); *G02B 2027/0105* (2013.01); *G02B 2027/0134* (2013.01); *G02B 2027/0174* (2013.01); *G03H 1/0005* (2013.01); *G03H 1/0248* (2013.01); *G03H 1/2202* (2013.01); *G03H 1/2294* (2013.01); *G03H 2001/0088* (2013.01); *G03H 2223/19* (2013.01); *G06F 3/01* (2013.01); *G06F 3/013* (2013.01); *G10K 11/26* (2013.01); *G21K 1/00* (2013.01); *H04N 5/89* (2013.01); *H04N 13/344* (2018.05); *H04N 23/957* (2023.01); *Y02E 10/52* (2013.01)

(56) References Cited

U.S. PATENT DOCUMENTS

| | | |
|---|---|---|
| 5,396,350 A | 3/1995 | Beeson et al. |
| 5,612,821 A | 3/1997 | Schmutz |
| 5,822,125 A | 10/1998 | Meyers |
| 6,124,974 A | 9/2000 | Burger |
| 6,169,594 B1 | 1/2001 | Aye et al. |
| 6,418,254 B1 | 7/2002 | Shikata et al. |
| 6,487,351 B1 | 11/2002 | Cryan et al. |
| 7,050,020 B2 | 5/2006 | Uehara et al. |
| 7,376,314 B2 | 5/2008 | Reininger |
| 7,986,374 B2 | 7/2011 | Ijzerman et al. |
| 8,294,987 B1 | 10/2012 | Nuland |
| 8,308,329 B1 | 11/2012 | Sethna |
| 8,442,397 B2 | 5/2013 | Kang et al. |
| 8,736,675 B1 | 5/2014 | Holzbach et al. |
| 8,953,012 B2 | 2/2015 | Williams et al. |
| 8,977,090 B2 | 3/2015 | Lambert et al. |
| 9,143,678 B2 | 9/2015 | Park et al. |
| 9,179,134 B2 | 11/2015 | Ranieri et al. |
| 9,188,737 B2 | 11/2015 | Joseph et al. |
| 9,256,060 B2 | 2/2016 | Kobori et al. |
| 9,343,020 B2 | 5/2016 | Heide et al. |
| 9,405,124 B2 | 8/2016 | Hirsch et al. |
| 9,706,116 B2 | 7/2017 | Meng et al. |
| 9,874,761 B2 | 1/2018 | Putten et al. |
| 9,904,065 B2 | 2/2018 | Jin et al. |
| 9,945,988 B2 | 4/2018 | Powell |
| 9,961,333 B1 | 5/2018 | Adolf et al. |
| 9,977,493 B2 | 5/2018 | Lanier et al. |
| 10,237,467 B2 | 3/2019 | Chang |
| 10,298,915 B2 | 5/2019 | Huh et al. |
| 10,341,632 B2 | 7/2019 | Pang et al. |
| 10,363,818 B2 | 7/2019 | Coser et al. |
| 10,432,919 B2 | 10/2019 | Lapstun |
| 10,488,584 B2 | 11/2019 | Karafin et al. |
| 10,560,689 B2 | 2/2020 | Lapstun |
| 10,561,309 B2 | 2/2020 | Das et al. |
| 10,816,939 B1 | 10/2020 | Coleman |
| 10,884,251 B2 | 1/2021 | Karafin et al. |
| 10,904,479 B2 | 1/2021 | Karafin et al. |
| 2002/0047893 A1 | 4/2002 | Kremen |
| 2003/0030912 A1 | 2/2003 | Gleckman et al. |
| 2003/0137730 A1 | 7/2003 | Fridman et al. |
| 2004/0240777 A1 | 12/2004 | Woodgate et al. |
| 2005/0243275 A1 | 11/2005 | Curatu |
| 2006/0077319 A1 | 4/2006 | Kitamura |
| 2006/0191566 A1 | 8/2006 | Schaafsma |
| 2008/0144174 A1 | 6/2008 | Lucente et al. |
| 2008/0211628 A1 | 9/2008 | Hashimoto et al. |
| 2009/0066917 A1 | 3/2009 | Hsu et al. |
| 2009/0266992 A1 | 10/2009 | Beekman |
| 2011/0134040 A1 | 6/2011 | Duparre et al. |
| 2011/0242461 A1 | 10/2011 | Escuti et al. |
| 2011/0254916 A1 | 10/2011 | Fan et al. |
| 2012/0224062 A1 | 9/2012 | Lacoste et al. |
| 2013/0216123 A1 | 8/2013 | Shroff et al. |
| 2014/0160573 A1 | 6/2014 | Teramura et al. |
| 2014/0300869 A1 | 10/2014 | Hirsch et al. |
| 2014/0320530 A1 | 10/2014 | Gruber et al. |
| 2014/0358002 A1 | 12/2014 | Daoura |
| 2015/0035880 A1 | 2/2015 | Heide et al. |
| 2015/0092071 A1 | 4/2015 | Meng et al. |
| 2015/0241608 A1 | 8/2015 | Shian et al. |
| 2015/0378183 A1 | 12/2015 | Pernice et al. |
| 2016/0091786 A1 | 3/2016 | Kazmierski et al. |
| 2016/0133762 A1 | 5/2016 | Claret |
| 2016/0309065 A1 | 10/2016 | Karafin et al. |
| 2018/0356591 A1 | 12/2018 | Karafin et al. |
| 2018/0372926 A1 | 12/2018 | Karafin et al. |
| 2018/0372958 A1 | 12/2018 | Karafin et al. |
| 2019/0004228 A1 | 1/2019 | Bevensee et al. |
| 2019/0011621 A1 | 1/2019 | Karafin et al. |
| 2019/0064435 A1 | 2/2019 | Karafin et al. |
| 2021/0373231 A1* | 12/2021 | Karafin .............. G02B 6/02295 |

FOREIGN PATENT DOCUMENTS

| | | |
|---|---|---|
| JP | 2000066132 A | 3/2000 |
| JP | 2003524205 A | 8/2003 |
| JP | 2005122041 A | 5/2005 |
| JP | 2007025601 A | 2/2007 |
| JP | 2007212781 A | 8/2007 |
| JP | 2008216955 A | 9/2008 |
| JP | 2009053263 A | 3/2009 |
| JP | 2010513964 A | 4/2010 |
| JP | 2010536069 A | 11/2010 |
| TW | 200700695 A | 1/2007 |

(56) References Cited

FOREIGN PATENT DOCUMENTS

| WO | 2013172233 A1 | 11/2013 |
|---|---|---|
| WO | 2014002526 A1 | 1/2014 |
| WO | 2016021442 A1 | 2/2016 |

OTHER PUBLICATIONS

AU-2017296238 Notice of Acceptance dated Feb. 12, 2019.
Cao et al., "Accelerating decomposition of light field video for compressive multi-layer display", Optics Express, vol. 23, No. 26, pp. 34007-34022, Dec. 24, 2015.
CN201780043907.8 First Office Action of the Chinese Patent Office dated Dec. 1, 2020.
EA-201892634 Office Action of the Eurasian Patent Office dated Mar. 25, 2020.
EP-17828597.9 European Extended Search Report of European Patent Office dated Jul. 20, 2020.
EP-17828624.1 European Extended Search Report of European Patent Office dated Mar. 9, 2020.
International Search Report and Written Opinion of PCT/US2017/042276 dated Nov. 24, 2017.
International Search Report and Written Opinion of PCT/US2017/042462 dated Oct. 30, 2017.
JP2019-501675 Non-Final Notice of Reasons for Rejection of the Japan Patent Office dated Jun. 1, 2021.
Miamone et al., 36:1 Wide Field of View Compressive Light Field Display using a Multilayer Architecture and Tracked Viewers. SID Symposium Digest of Technical Papers. 2014; 45(1):509-512. (Year 2014).
TW-106123879 Office Action of the Taiwan Patent Office dated Oct. 29, 2020.
Wetzstein et al., "Compressive Light Field Displays", IEEE Computer Graphics and Applications, 2012.
Wetzstein et al., "On Plenoptic Multiplexing and Reconstruction", International Journal on Computer Vision (IJCV, vol. 101, No. 2, (20130000), pp. 384-400, URL: https://hal.inria.fr/hal-00876493, (Sep. 26, 2017).
Wetzstein et al., "Real-time Image Generation for Compressive Light Field Displays", Journal of Physics: Conference Series (2013).
IN201917001780 First Examination Report from the Indian Patent Office dated Aug. 13, 2021.
JP2019-501706 Non-Final Notice of Reasons for Rejection from the Japan Patent Office dated Aug. 10, 2021.
Anonymous: "Waveguide (optics)—Wikipedia, the free encyclopedia", , Jul. 5, 2013 (Jul. 5, 2013), XP055410779, Retrieved from the Internet: URL:https://web.archive.org/web/20130705191632/https://en.wikipedia.org/wiki/Waveguide_(optics) [retrieved on Sep. 27, 2017].
EP-17828624.1 European Exam Report of European Patent Office dated Apr. 19, 2022.
JP2022-076343 Non-Final Notice of Reasons for Rejection of the Japan Patent Office dated Mar. 14, 2023.

\* cited by examiner

HOLOGRAPHIC SUPERIMPOSITION OF REAL WORLD PLENOPTIC OPACITY MODULATION THROUGH TRANSPARENT WAVEGUIDE ARRAYS FOR LIGHT FIELD, VIRTUAL AND AUGMENTED REALITY

TECHNICAL FIELD

This disclosure generally relates to light field and 4D energy modulation systems, and more specifically, to holographic propagation through energy waveguide relay systems for superimposition of digital opacity into a real-world coordinate system.

BACKGROUND

The dream of an interactive virtual world within a "holodeck" chamber as popularized by Gene Roddenberry's Star Trek and originally envisioned by author Alexander Moszkowski in the early 1900s has been the inspiration for science fiction and technological innovation for nearly a century. However, no compelling implementation of this experience exists outside of literature, media, and the collective imagination of children and adults alike.

SUMMARY

Disclosed are transparent energy relay waveguide systems for the superimposition of holographic opacity modulation states for holographic, light field, virtual, augmented and mixed reality applications.

In one embodiment, a transparent display system includes: a first energy waveguide relay system configured such that energy passing therethrough is directed according to a first 4D plenoptic function; a second energy waveguide relay system following the first energy waveguide relay system, the second energy waveguide relay system configured such that energy passing therethrough is directed according to a second 4D plenoptic function, the second 4D plenoptic function inverse of the first 4D plenoptic function; and a first energy modulation element disposed in a first location in the first energy waveguide relay system, in a second location in the second energy waveguide relay system or in a third location in between the first energy waveguide relay system and the second energy waveguide relay system, the first energy modulation element configured to modulate energy passing therethrough.

In some embodiments, the first energy waveguide relay system includes a first array of energy waveguides configured to direct energy therethrough along a plurality of energy propagation paths, where the energy waveguides of the first array are located at different spatial coordinates, and where each energy waveguide directs energy from the respective spatial coordinate to the plurality of energy propagation paths along different directions according to the first 4D plenoptic function.

In other embodiments, the second energy waveguide relay system includes a second array of energy waveguides configured to direct energy therethrough along a plurality of energy propagation paths, where the energy waveguides of the second array are located at different spatial coordinates, and each energy waveguide directs energy from the respective spatial coordinate to the plurality of energy propagation paths along different directions according to the second 4D plenoptic function.

In one embodiment, the system further includes a second energy modulation element located in one of the first, second, or third location, the second energy modulation element configured to modulate energy passing therethrough. In one embodiment, the first and second energy modulation elements are located at the same location. In another embodiment, the first and second energy modulation elements are located at different locations.

In one embodiment, the system further includes third energy modulation element located in one of the first, second, or third location, the third energy modulation element configured to modulate energy passing therethrough. In some embodiments, the third energy modulation elements and at least one of the first and second energy modulation elements are located at the same location.

In one embodiment, the first, second, and third energy modulation elements are located at the same location. In another embodiment, the first, second, and third energy modulation elements are located at different locations.

In some embodiments, each of the first, second and third energy modulation elements include LCD, LED, DLP, OLED, LCOS, quantum dot, or other suitable energy modulating elements. In another embodiment, at least one of the first energy waveguide relay system and the second energy waveguide relay system is curved. In yet another embodiment, both the first energy waveguide relay system and the second energy waveguide relay system are curved.

In one embodiment, a transparent system includes: a first energy waveguide relay system configured such that energy passing therethrough is directed according to a first 4D plenoptic function; a second energy waveguide relay system following the first energy waveguide relay system, the second energy waveguide relay system configured such that energy passing therethrough is directed according to a second 4D plenoptic function, the second 4D plenoptic function inverse of the first 4D plenoptic function; a first energy modulation element disposed in a first location in the first energy waveguide relay system, in a second location in the second energy waveguide relay system or in a third location in between the first energy waveguide relay system and the second energy waveguide relay system, the first energy modulation element configured to modulate energy passing therethrough; and a second energy modulation element located in one of the first, second, or third location, the second energy modulation element configured to modulate energy passing therethrough.

In another embodiment, the first energy waveguide relay system includes a first array of energy waveguides configured to direct energy therethrough along a plurality of energy propagation paths, where the energy waveguides of the first array are located at different spatial coordinates, and each energy waveguide directs energy from the respective spatial coordinate to the plurality of energy propagation paths along different directions according to the first 4D plenoptic function.

In another embodiment, the second energy waveguide relay system includes a second array of energy waveguides configured to direct energy therethrough along a plurality of energy propagation paths, where the energy waveguides of the second array are located at different spatial coordinates, and each energy waveguide directs energy from the respective spatial coordinate to the plurality of energy propagation paths along different directions according to the second 4D plenoptic function.

In one embodiment, the first and second energy modulation elements are located at the same location. In another embodiment, the first and second energy modulation elements are located at different locations.

In some embodiments, the system further includes a third energy modulation element located in one of the first, second, or third location, the third energy modulation element configured to modulate energy passing therethrough. In one embodiment, the third energy modulation elements and at least one of the first and second energy modulation elements are located at the same location.

In some embodiments, the first, second, and third energy modulation elements are located at the same location. In other embodiments, the first, second, and third energy modulation elements are located at different locations.

In some embodiments, each of the first, second and third energy modulation elements include LCD, LED, DLP, OLED, LCOS, quantum dot, or other suitable energy modulating elements. In another embodiment, at least one of the first energy waveguide relay system and the second energy waveguide relay system is curved. In yet another embodiment, both the first energy waveguide relay system and the second energy waveguide relay system are curved.

In another embodiment, a transparent system includes: a first energy waveguide relay system configured such that energy passing therethrough is directed according to a first 4D plenoptic function; a second energy waveguide relay system following the first energy waveguide relay system, the second energy waveguide relay system configured such that energy passing therethrough is directed according to a second 4D plenoptic function, the second 4D plenoptic function inverse of the first 4D plenoptic function; a first energy modulation element disposed in a first location in the first energy waveguide relay system, in a second location in the second energy waveguide relay system or in a third location in between the first energy waveguide relay system and the second energy waveguide relay system, the first energy modulation element configured to modulate energy passing therethrough; a second energy modulation element located in one of the first, second, or third location, the second energy modulation element configured to modulate energy passing therethrough; and a third energy modulation element located in one of the first, second, or third location, the third energy modulation element configured to modulate energy passing therethrough.

In one embodiment, the first energy waveguide relay system includes a first array of energy waveguides configured to direct energy therethrough along a plurality of energy propagation paths, where the energy waveguides of the first array are located at different spatial coordinates, and each energy waveguide directs energy from the respective spatial coordinate to the plurality of energy propagation paths along different directions according to the first 4D plenoptic function.

In another embodiment, the second energy waveguide relay system includes a second array of energy waveguides configured to direct energy therethrough along a plurality of energy propagation paths, where the energy waveguides of the second array are located at different spatial coordinates, and each energy waveguide directs energy from the respective spatial coordinate to the plurality of energy propagation paths along different directions according to the second 4D plenoptic function.

In one embodiment, the first and second energy modulation elements are located at the same location. In another embodiment, the first and second energy modulation elements are located at different locations. In some embodiments, the third energy modulation elements and at least one of the first and second energy modulation elements are located at the same location. In other embodiments, the first, second, and third energy modulation elements are located at the same location. In yet some other embodiments, the first, second, and third energy modulation elements are located at different locations.

In some embodiments, each of the first, second and third energy modulation elements include LCD, LED, DLP, OLED, LCOS, quantum dot, or other suitable energy modulating elements. In another embodiment, at least one of the first energy waveguide relay system and the second energy waveguide relay system is curved. In yet another embodiment, both the first energy waveguide relay system and the second energy waveguide relay system are curved.

In one embodiment, a transparent display system includes: a first energy waveguide relay system configured such that energy passing therethrough is directed according to a first 4D plenoptic function; a second energy waveguide relay system following the first energy waveguide relay system, the second energy waveguide relay system configured such that energy passing therethrough is directed according to a second 4D plenoptic function, the second 4D plenoptic function inverse of the first 4D plenoptic function; a first energy modulation element disposed in the first energy waveguide relay system; a second energy modulation element disposed in between the first energy waveguide relay system and the second energy waveguide relay system; and a third energy modulation element disposed in the second energy waveguide relay system, where the first, second and third energy modulation elements are configured to modulate energy passing therethrough.

In one embodiment, the first energy waveguide relay system includes a first array of energy waveguides configured to direct energy therethrough along a plurality of energy propagation paths, where the energy waveguides of the first array are located at different spatial coordinates, and each energy waveguide directs energy from the respective spatial coordinate to the plurality of energy propagation paths along different directions according to the first 4D plenoptic function.

In another embodiment, the second energy waveguide relay system includes a second array of energy waveguides configured to direct energy therethrough along a plurality of energy propagation paths, where the energy waveguides of the second array are located at different spatial coordinates, and each energy waveguide directs energy from the respective spatial coordinate to the plurality of energy propagation paths along different directions according to the second 4D plenoptic function.

In some embodiments, each of the first, second and third energy modulation elements include LCD, LED, DLP, OLED, LCOS, quantum dot, or other suitable energy modulating elements. In another embodiment, the system further includes one or more additional energy modulation elements located in one of the first, second, or third location, the one or more additional energy modulation elements configured to modulate energy passing therethrough.

In one embodiment, the one or more additional energy modulation elements and at least one of the first, second and third energy modulation elements are located at the same location. In another embodiment, the one or more additional energy modulation elements and at least one of the first, second and third energy modulation elements are located at different locations. In one embodiment, at least one of the first energy waveguide relay system and the second energy waveguide relay system is curved. In another embodiment, both the first energy waveguide relay system and the second energy waveguide relay system are curved.

In some embodiments, the first energy modulation element includes white opacity, the second energy modulation element includes an additional opacity or color, and the third energy modulation element includes black opacity.

In one example, the first and third energy modulation element are both OLEDs and the second energy modulation element is an LCD such that to present an opaque black color the first modulation element is configured to an off state, the second modulation element is configured to an on state, and the third modulation element can be configured to an on state or an off state.

In another example, the first and third energy modulation element are both OLEDs and the second energy modulation element is an LCD such that to present a transparent black color the first modulation element is configured to an off state, the second modulation element is configured to an off state, and the third modulation element is configured to an off state.

In one example, the first and third energy modulation element are both OLEDs and the second energy modulation element is an LCD such that to present an opaque red color the first modulation element is configured to a red only on state, the second modulation element can be configured to an on state or an off state, and the third modulation element is configured to an off state.

In another example, the first and third energy modulation element are both OLEDs and the second energy modulation element is an LCD such that to present a transparent red color the first modulation element is configured to a red only state at a first percentage, the second modulation element is configured to an off state, and the third modulation element is configured to a red only state at a second percentage, the second percentage different than the first percentage.

In one example, the first and third energy modulation element are both OLEDs and the second energy modulation element is an LCD such that to present an opaque grey color the first modulation element is configured to an on state at a first percentage, the second modulation element is configured to an on state, and the third modulation element is configured to an off state.

In another example, the first and third energy modulation element are both OLEDs and the second energy modulation element is an LCD such that to present a transparent grey color the first modulation element is configured to an on state at a first percentage, the second modulation element is configured to an off state, and the third modulation element is configured to an on state at a second percentage, the second percentage different than the first percentage.

These and other advantages of the present disclosure will become apparent to those skilled in the art from the following detailed description and the appended claims.

DETAILED DESCRIPTION

Figure 1:
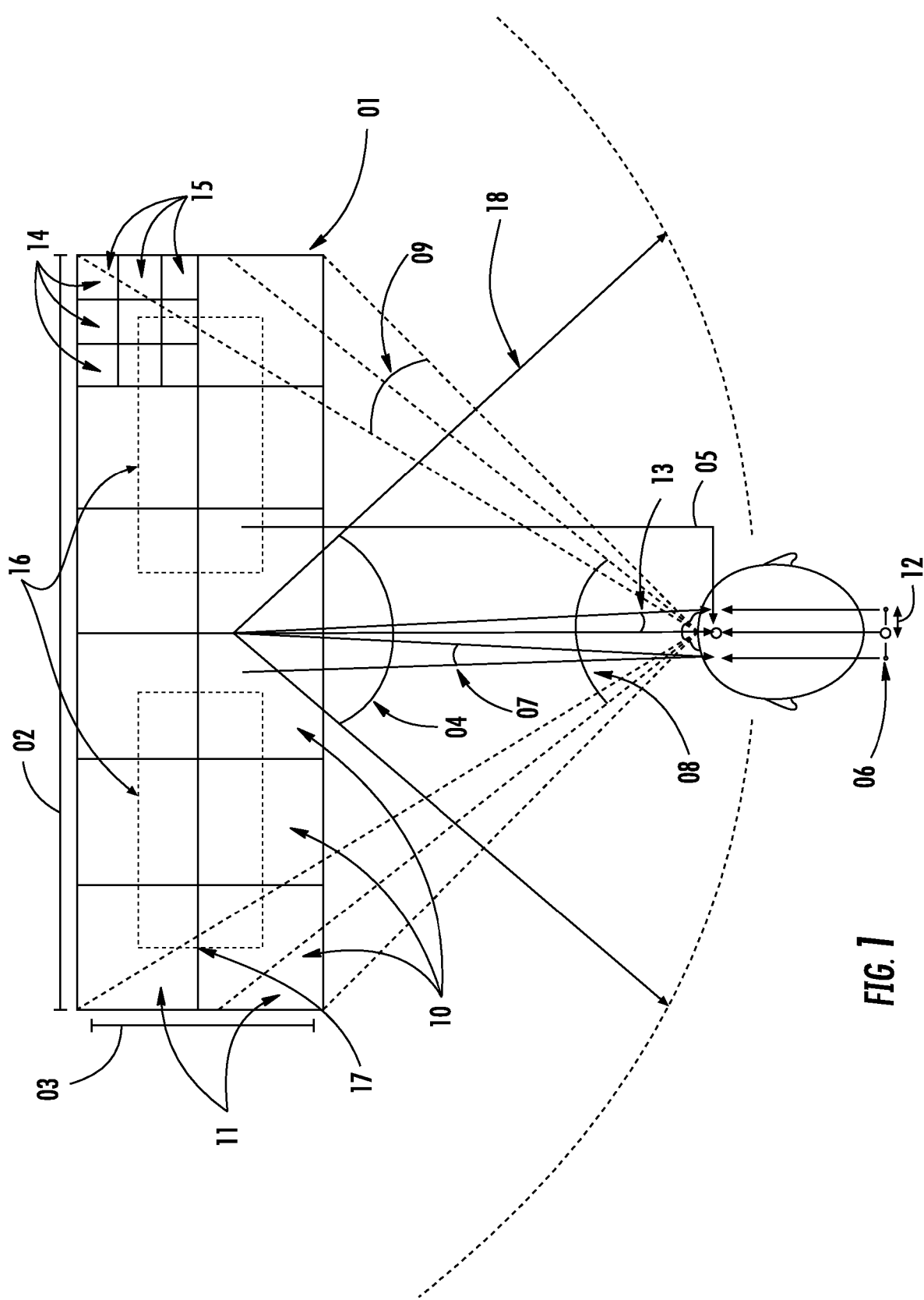
FIG. 1 is a schematic diagram illustrating design parameters for an energy directing system.

An embodiment of a Holodeck (collectively called "Holodeck Design Parameters") provide sufficient energy stimulus to fool the human sensory receptors into believing that received energy impulses within a virtual, social and interactive environment are real, providing: 1) binocular disparity without external accessories, head-mounted eyewear, or other peripherals; 2) accurate motion parallax, occlusion and opacity throughout a viewing volume simultaneously for any number of viewers; 3) visual focus through synchronous convergence, accommodation and miosis of the eye for all perceived rays of light; and 4) converging energy wave propagation of sufficient density and resolution to exceed the human sensory "resolution" for vision, hearing, touch, taste, smell, and/or balance.

Based upon conventional technology to date, we are decades, if not centuries away from a technology capable of providing for all receptive fields in a compelling way as suggested by the Holodeck Design Parameters including the visual, auditory, somatosensory, gustatory, olfactory, and vestibular systems.

In this disclosure, the terms light field and holographic may be used interchangeably to define the energy propagation for stimulation of any sensory receptor response. While initial disclosures may refer to examples of electromagnetic and mechanical energy propagation through energy surfaces for holographic imagery and volumetric haptics, all forms of sensory receptors are envisioned in this disclosure. Furthermore, the principles disclosed herein for energy propagation along propagation paths may be applicable to both energy emission and energy capture.

Many technologies exist today that are often unfortunately confused with holograms including lenticular printing, Pepper's Ghost, glasses-free stereoscopic displays, horizontal parallax displays, head-mounted VR and AR displays (HMD), and other such illusions generalized as "fauxlography." These technologies may exhibit some of the desired properties of a true holographic display, however, lack the ability to stimulate the human visual sensory response in any way sufficient to address at least two of the four identified Holodeck Design Parameters.

These challenges have not been successfully implemented by conventional technology to produce a seamless energy surface sufficient for holographic energy propagation. There are various approaches to implementing volumetric and direction multiplexed light field displays including parallax barriers, hogels, voxels, diffractive optics, multi-view projection, holographic diffusers, rotational mirrors, multilayered displays, time sequential displays, head mounted display, etc., however, conventional approaches may involve a compromise on image quality, resolution, angular sampling density, size, cost, safety, frame rate, etc., ultimately resulting in an unviable technology.

To achieve the Holodeck Design Parameters for the visual, auditory, somatosensory systems, the human acuity of each of the respective systems is studied and understood to propagate energy waves to sufficiently fool the human sensory receptors. The visual system is capable of resolving to approximately 1 arc min, the auditory system may distinguish the difference in placement as little as three degrees, and the somatosensory system at the hands are capable of discerning points separated by 2-12 mm. While there are various and conflicting ways to measure these acuities, these values are sufficient to understand the systems and methods to stimulate perception of energy propagation.

Of the noted sensory receptors, the human visual system is by far the most sensitive given that even a single photon can induce sensation. For this reason, much of this introduction will focus on visual energy wave propagation, and vastly lower resolution energy waveguide relay systems coupled within a disclosed energy waveguide surface may converge appropriate signals to induce holographic sensory perception. Unless otherwise noted, all disclosures apply to all energy and sensory domains.

When calculating for effective design parameters of the energy propagation for the visual system given a viewing volume and viewing distance, a desired energy surface may be designed to include many gigapixels of effective energy location density. For wide viewing volumes, or near field viewing, the design parameters of a desired energy surface may include hundreds of gigapixels or more of effective energy location density. By comparison, a desired energy source may be designed to have 1 to 250 effective megapixels of energy location density for ultrasonic propagation of volumetric haptics or an array of 36 to 3,600 effective energy locations for acoustic propagation of holographic sound depending on input environmental variables. What is important to note is that with a disclosed bi-directional energy surface architecture, all components may be configured to form the appropriate structures for any energy domain to enable holographic propagation.

However, the main challenge to enable the Holodeck today involves available visual technologies and electromagnetic device limitations. Acoustic and ultrasonic devices are less challenging given the orders of magnitude difference in desired density based upon sensory acuity in the respective receptive field, although the complexity should not be underestimated. While holographic emulsion exists with resolutions exceeding the desired density to encode interference patterns in static imagery, state-of-the-art display devices are limited by resolution, data throughput and manufacturing feasibility. To date, no singular display device has been able to meaningfully produce a light field having near holographic resolution for visual acuity.

Production of a single silicon-based device capable of meeting the desired resolution for a compelling light field display may not practical and may involve extremely complex fabrication processes beyond the current manufacturing capabilities. The limitation to tiling multiple existing display devices together involves the seams and gap formed by the physical size of packaging, electronics, enclosure, optics and a number of other challenges that inevitably result in an unviable technology from an imaging, cost and/or a size standpoint.

The embodiments disclosed herein may provide a real-world path to building the Holodeck.

Example embodiments will now be described hereinafter with reference to the accompanying drawings, which form a part hereof, and which illustrate example embodiments which may be practiced. As used in the disclosures and the appended claims, the terms "embodiment", "example embodiment", and "exemplary embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a," "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items.

Holographic System Considerations

Overview of Light Field Energy Propagation Resolution

Light field and holographic display is the result of a plurality of projections where energy surface locations provide angular, color and intensity information propagated within a viewing volume. The disclosed energy surface provides opportunities for additional information to coexist and propagate through the same surface to induce other sensory system responses. Unlike a stereoscopic display, the viewed position of the converged energy propagation paths in space do not vary as the viewer moves around the viewing volume and any number of viewers may simultaneously see propagated objects in real-world space as if it was truly there. In some embodiments, the propagation of energy may be located in the same energy propagation path but in opposite directions. For example, energy emission and energy capture along an energy propagation path are both possible in some embodiments of the present disclosed.

FIG. 1 is a schematic diagram illustrating variables relevant for stimulation of sensory receptor response. These variables may include surface diagonal 101, surface width 102, surface height 103, a determined target seating distance 118, the target seating field of view field of view from the center of the display 104, the number of intermediate samples demonstrated here as samples between the eyes 105, the average adult inter-ocular separation 106, the average resolution of the human eye in arcmin 107, the horizontal field of view formed between the target viewer location and the surface width 108, the vertical field of view formed between the target viewer location and the surface height 109, the resultant horizontal waveguide element resolution, or total number of elements, across the surface 110, the resultant vertical waveguide element resolution, or total number of elements, across the surface 111, the sample distance based upon the inter-ocular spacing between the eyes and the number of intermediate samples for angular projection between the eyes 112, the angular sampling may be based upon the sample distance and the target seating distance 113, the total resolution Horizontal per waveguide element derived from the angular sampling desired 114, the total resolution Vertical per waveguide element derived from the angular sampling desired 115, device Horizontal is the count of the determined number of discreet energy sources desired 116, and device Vertical is the count of the determined number of discreet energy sources desired 117.

A method to understand the desired minimum resolution may be based upon the following criteria to ensure sufficient stimulation of visual (or other) sensory receptor response: surface size (e.g., 84" diagonal), surface aspect ratio (e.g., 16:9), seating distance (e.g., 128" from the display), seating field of view (e.g., 120 degrees or +/−60 degrees about the center of the display), desired intermediate samples at a distance (e.g., one additional propagation path between the eyes), the average inter-ocular separation of an adult (approximately 65 mm), and the average resolution of the human eye (approximately 1 arcmin). These example values should be considered placeholders depending on the specific application design parameters.

Further, each of the values attributed to the visual sensory receptors may be replaced with other systems to determine desired propagation path parameters. For other energy propagation embodiments, one may consider the auditory system's angular sensitivity as low as three degrees, and the somatosensory system's spatial resolution of the hands as small as 2-12 mm.

While there are various and conflicting ways to measure these sensory acuities, these values are sufficient to understand the systems and methods to stimulate perception of virtual energy propagation. There are many ways to consider the design resolution, and the below proposed methodology combines pragmatic product considerations with the biological resolving limits of the sensory systems. As will be appreciated by one of ordinary skill in the art, the following overview is a simplification of any such system design, and should be considered for exemplary purposes only.

With the resolution limit of the sensory system understood, the total energy waveguide element density may be calculated such that the receiving sensory system cannot discern a single energy waveguide element from an adjacent element, given:

- Surface Aspect Ratio $= \frac{\text{Width }(W)}{\text{Height }(H)}$

- Surface Horizontal Size $= \text{Surface Diagonal} * \left( \frac{1}{\sqrt{1 + \left(\frac{H}{W}\right)^2}} \right)$

- Surface Vertical Size $= \text{Surface Diagonal} * \left( \frac{1}{\sqrt{1 + \left(\frac{W}{H}\right)^2}} \right)$

- Horizontal Field of View $= 2 * \operatorname{atan}\left( \frac{\text{Surface Horizontal Size}}{2 * \text{Seating Distance}} \right)$

- Vertical Field of View $= 2 * \operatorname{atan}\left( \frac{\text{Surface Vertical Size}}{2 * \text{Seating Distance}} \right)$

- Horizontal Element Resoluation $= \text{Horizontal } FoV * \frac{60}{\text{Eye Resolution}}$

- Vertical Element Resoluation $= \text{Vertical } FoV * \frac{60}{\text{Eye Resolution}}$ The above calculations result in approximately a 32×18° field of view resulting in approximately 1920×1080 (rounded to nearest format) energy waveguide elements being desired. One may also constrain the variables such that the field of view is consistent for both (u, v) to provide a more regular spatial sampling of energy locations (e.g. pixel aspect ratio). The angular sampling of the system assumes a defined target viewing volume location and additional propagated energy paths between two points at the optimized distance, given:

- Sample Distance $= \frac{\text{Inter–Ocular Distance}}{(\text{Number of Desired Intermediate Samples} + 1)}$

- Angular Sampling $= \operatorname{atan}\left( \frac{\text{Sample Distance}}{\text{Seating Distance}} \right)$ In this case, the inter-ocular distance is leveraged to calculate the sample distance although any metric may be leveraged to account for appropriate number of samples at a given distance. With the above variables considered, approximately one ray per 0.57° may be desired and the total system resolution per independent sensory system may be determined, given:

- Locations Per Element$(N) = \frac{\text{Seating } FoV}{\text{Angular Sampling}}$

- Total Resolution $H = N * \text{Horizontal Element Resolution}$

- Total Resolution $V = N * \text{Vertical Element Resolution}$

With the above scenario given the size of energy surface and the angular resolution addressed for the visual acuity system, the resultant energy surface may desirably include approximately 400 k×225 k pixels of energy resolution locations, or 90 gigapixels holographic propagation density. These variables provided are for exemplary purposes only and many other sensory and energy metrology considerations should be considered for the optimization of holographic propagation of energy. In an additional embodiment, 1 gigapixel of energy resolution locations may be desired based upon the input variables. In an additional embodiment, 1,000 gigapixels of energy resolution locations may be desired based upon the input variables.

Current Technology Limitations

Active Area, Device Electronics, Packaging, and the Mechanical Envelope

Figure 2:
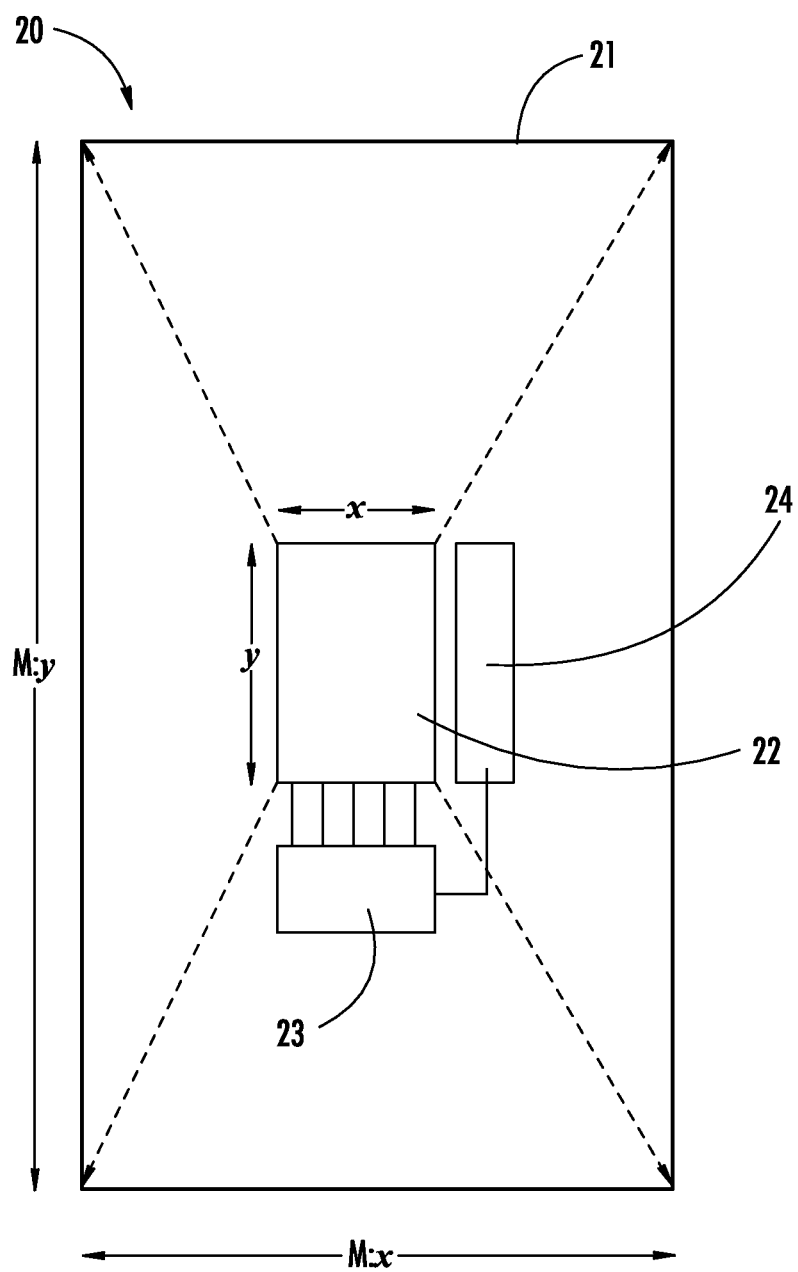
FIG. 2 is a schematic diagram illustrating an energy waveguide relay system having an active device area with a mechanical envelope.

FIG. 2 illustrates a device 200 having an active area 220 with a certain mechanical form factor. The device 200 may include drivers 230 and electronics 240 for powering and interface to the active area 220, the active area having a dimension as shown by the x and y arrows. This device 200 does not take into account the cabling and mechanical structures to drive, power and cool components, and the mechanical footprint may be further minimized by introducing a flex cable into the device 200. The minimum footprint for such a device 200 may also be referred to as a mechanical envelope 210 having a dimension as shown by the M:x and M:y arrows. This device 200 is for illustration purposes only and custom electronics designs may further decrease the mechanical envelope overhead, but in almost all cases may not be the exact size of the active area of the device. In an embodiment, this device 200 illustrates the dependency of electronics as it relates to active image area 220 for a micro OLED, DLP chip or LCD panel, or any other technology with the purpose of image illumination.

In some embodiments, it may also be possible to consider other projection technologies to aggregate multiple images onto a larger overall display. However, this may come at the cost of greater complexity for throw distance, minimum focus, optical quality, uniform field resolution, chromatic aberration, thermal properties, calibration, alignment, additional size or form factor. For most practical applications, hosting tens or hundreds of these projection sources 200 may result in a design that is much larger with less reliability.

For exemplary purposes only, assuming energy devices with an energy location density of 3840×2160 sites, one may determine the number of individual energy devices (e.g., device 100) desired for an energy surface, given:

- Devices $H = \dfrac{\text{Total Resolution } H}{\text{Device Resolution } H}$
- Devices $V = \dfrac{\text{Total Resolution } V}{\text{Device Resolution } V}$ Given the above resolution considerations, approximately 105×105 devices similar to those shown in FIG. 2 may be desired. It should be noted that many devices consist of various pixel structures that may or may not map to a regular grid. In the event that there are additional sub-pixels or locations within each full pixel, these may be exploited to generate additional resolution or angular density. Additional signal processing may be used to determine how to convert the light field into the correct (u,v) coordinates depending on the specified location of the pixel structure(s) and can be an explicit characteristic of each device that is known and calibrated. Further, other energy domains may involve a different handling of these ratios and device structures, and those skilled in the art will understand the direct intrinsic relationship between each of the desired frequency domains. This will be shown and discussed in more detail in subsequent disclosure.

The resulting calculation may be used to understand how many of these individual devices may be desired to produce a full resolution energy surface. In this case, approximately 105×105 or approximately 11,080 devices may be desired to achieve the visual acuity threshold. The challenge and novelty exists within the fabrication of a seamless energy surface from these available energy locations for sufficient sensory holographic propagation.

Summary of Seamless Energy Surfaces

Configurations and Designs for Arrays of Energy Relays

In some embodiments, approaches are disclosed to address the challenge of generating high energy location density from an array of individual devices without seams due to the limitation of mechanical structure for the devices. In an embodiment, an energy propagating relay system may allow for an increase the effective size of the active device area to meet or exceed the mechanical dimensions to configure an array of relays and form a singular seamless energy surface.

Figure 3:
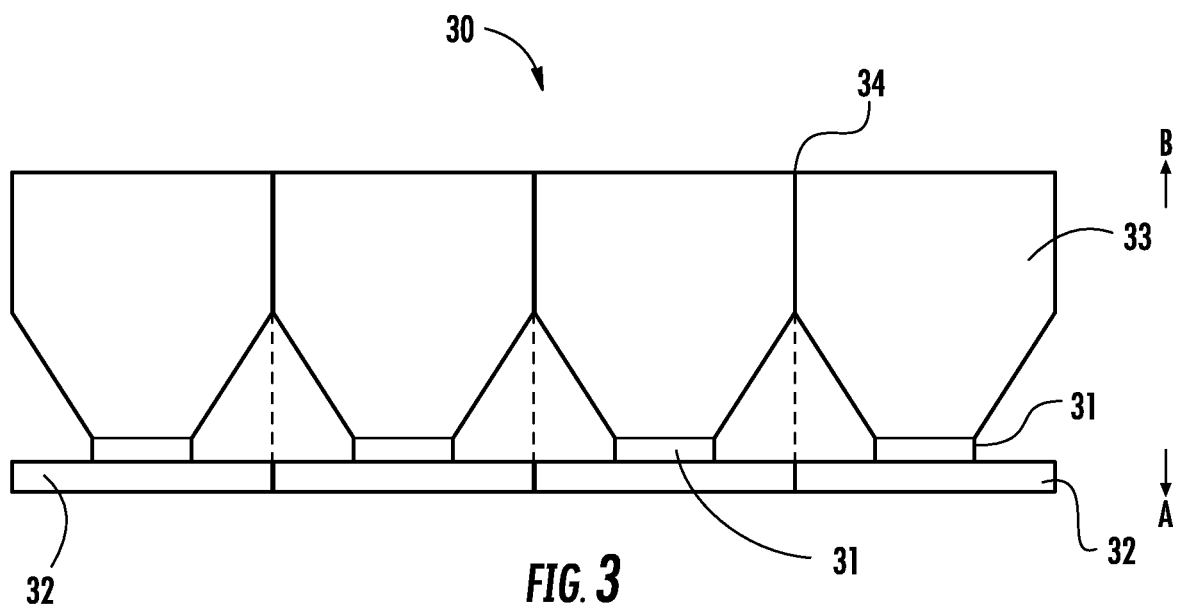
FIG. 3 is a schematic diagram illustrating an energy relay system.

FIG. 3 illustrates an embodiment of such an energy relay system 300. As shown, the relay system 300 may include a device 310 mounted to a mechanical envelope 320, with an energy relay element 330 propagating energy from the device 310. The relay element 330 may be configured to provide the ability to mitigate any gaps 340 that may be produced when multiple mechanical envelopes 320 of the device are placed into an array of multiple devices 310.

For example, if a device's active area 310 is 20 mm×10 mm and the mechanical envelope 320 is 40 mm×20 mm, an energy relay element 330 may be designed with a magnification of 2:1 to produce a tapered form that is approximately 20 mm×10 mm on a minified end (arrow A) and 40 mm×20 mm on a magnified end (arrow B), providing the ability to align an array of these elements 330 together seamlessly without altering or colliding with the mechanical envelope 320 of each device 310. Mechanically, the relay elements 330 may be bonded or fused together to align and polish ensuring minimal seam gap 340 between devices 310. In one such embodiment, it is possible to achieve a seam gap 340 smaller than the visual acuity limit of the eye.

Figure 4:
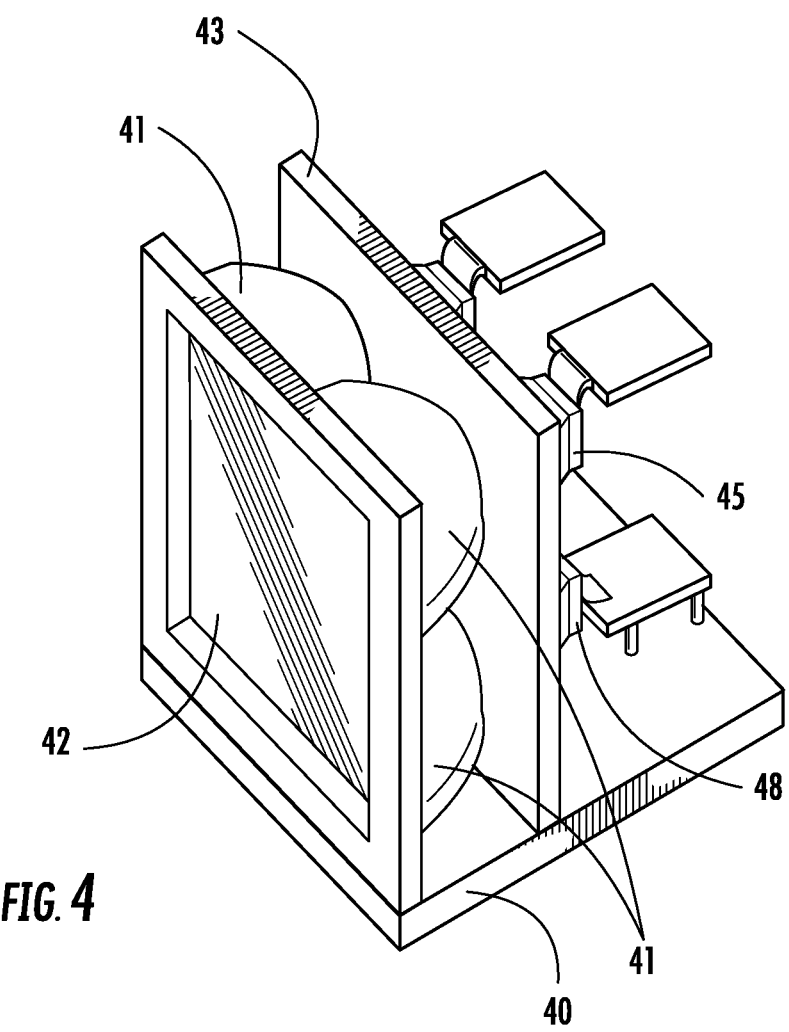
FIG. 4 is a schematic diagram illustrating an embodiment of energy relay elements adhered together and fastened to a base structure.

FIG. 4 illustrates an example of a base structure 400 having energy relay elements 410 formed together and securely fastened to an additional mechanical structure 430. The mechanical structure of the seamless energy surface 420 provides the ability to couple multiple energy relay elements 410, 450 in series to the same base structure through bonding or other mechanical processes to mount relay elements 410, 450. In some embodiments, each relay element 410 may be fused, bonded, adhered, pressure fit, aligned or otherwise attached together to form the resultant seamless energy surface 420. In some embodiments, a device 480 may be mounted to the rear of the relay element 410 and aligned passively or actively to ensure appropriate energy location alignment within the determined tolerance is maintained.

In an embodiment, the seamless energy surface comprises one or more energy locations and one or more energy relay element stacks comprise a first and second side and each energy relay element stack is arranged to form a singular seamless display surface directing energy along propagation paths extending between one or more energy locations and the seamless display surface, and where the separation between the edges of any two adjacent second sides of the terminal energy relay elements is less than the minimum perceptible contour as defined by the visual acuity of a human eye having better than 20/40 vision at a distance greater than the width of the singular seamless display surface.

In an embodiment, each of the seamless energy surfaces comprise one or more energy relay elements each with one or more structures forming a first and second surface with a transverse and longitudinal orientation. The first relay surface has an area different than the second resulting in positive or negative magnification and configured with explicit surface contours for both the first and second surfaces passing energy through the second relay surface to substantially fill a +/−10 degree angle with respect to the normal of the surface contour across the entire second relay surface.

In an embodiment, multiple energy domains may be configured within a single, or between multiple energy relays to direct one or more sensory holographic energy propagation paths including visual, acoustic, tactile or other energy domains.

In an embodiment, the seamless energy surface is configured with energy relays that comprise two or more first sides for each second side to both receive and emit one or more energy domains simultaneously to provide bi-directional energy propagation throughout the system.

In an embodiment, the energy relays are provided as loose coherent elements.

Introduction to Component Engineered Structures

Disclosed Advances in Transverse Anderson Localization Energy Relays

The properties of energy relays may be significantly optimized according to the principles disclosed herein for energy relay elements that induce Transverse Anderson Localization. Transverse Anderson Localization is the propagation of a ray transported through a transversely disordered but longitudinally consistent material.

This implies that the effect of the materials that produce the Anderson Localization phenomena may be less impacted by total internal reflection than by the randomization between multiple-scattering paths where wave interference can completely limit the propagation in the transverse orientation while continuing in the longitudinal orientation.

Of significant additional benefit is the elimination of the cladding of traditional multi-core optical fiber materials. The cladding is to functionally eliminate the scatter of energy between fibers, but simultaneously act as a barrier to rays of energy thereby reducing transmission by at least the core to clad ratio (e.g., a core to clad ratio of 70:30 will transmit at best 70% of received energy transmission) and additionally forms a strong pixelated patterning in the propagated energy.

Figure 5A:
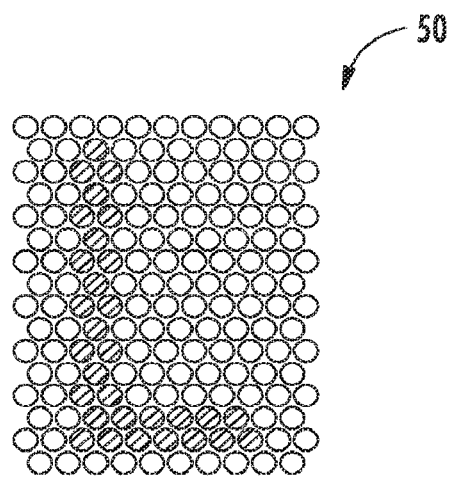
FIG. 5A is a schematic diagram illustrating an example of a relayed image through multi-core optical fibers.

FIG. 5A illustrates an end view of an example of one such non-Anderson Localization energy relay 500, wherein an image is relayed through multi-core optical fibers where pixilation and fiber noise may be exhibited due to the intrinsic properties of the optical fibers. With traditional multi-mode and multi-core optical fibers, relayed images may be intrinsically pixelated due to the properties of total internal reflection of the discrete array of cores where any cross-talk between cores will reduce the modulation transfer function and increase blurring. The resulting imagery produced with traditional multi-core optical fiber tends to have a residual fixed noise fiber pattern similar to those shown in FIG. 3.

Figure 5B:
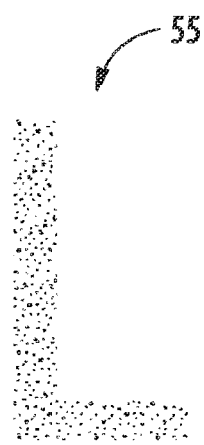
FIG. 5B is a schematic diagram illustrating an example of a relayed image through an optical relay that exhibits the properties of the Transverse Anderson Localization principle.

FIG. 5B, illustrates an example of the same relayed image 550 through an energy relay comprising materials that exhibit the properties of Transverse Anderson Localization, where the relayed pattern has a greater density grain structures as compared to the fixed fiber pattern from FIG. 5A. In an embodiment, relays comprising randomized microscopic component engineered structures induce Transverse Anderson Localization and transport light more efficiently with higher propagation of resolvable resolution than commercially available multi-mode glass optical fibers.

There is significant advantage to the Transverse Anderson Localization material properties in terms of both cost and weight, where a similar optical grade glass material, may cost and weigh upwards of 10 to 100-fold more than the cost for the same material generated within an embodiment, wherein disclosed systems and methods comprise randomized microscopic component engineered structures demonstrating significant opportunities to improve both cost and quality over other technologies known in the art.

In an embodiment, a relay element exhibiting Transverse Anderson Localization may comprise a plurality of at least two different component engineered structures in each of three orthogonal planes arranged in a dimensional lattice and the plurality of structures form randomized distributions of material wave propagation properties in a transverse plane within the dimensional lattice and channels of similar values of material wave propagation properties in a longitudinal plane within the dimensional lattice, wherein localized energy waves propagating through the energy relay have higher transport efficiency in the longitudinal orientation versus the transverse orientation.

In an embodiment, multiple energy domains may be configured within a single, or between multiple Transverse Anderson Localization energy relays to direct one or more sensory holographic energy propagation paths including visual, acoustic, tactile or other energy domains.

In an embodiment, the seamless energy surface is configured with Transverse Anderson Localization energy relays that comprise two or more first sides for each second side to both receive and emit one or more energy domains simultaneously to provide bi-directional energy propagation throughout the system.

In an embodiment, the Transverse Anderson Localization energy relays are configured as loose coherent or flexible energy relay elements.

Considerations for 4D Plenoptic Functions

Selective Propagation of Energy Through Holographic Waveguide Arrays

As discussed above and herein throughout, a light field display system generally includes an energy source (e.g., illumination source) and a seamless energy surface configured with sufficient energy location density as articulated in the above discussion. A plurality of relay elements may be used to relay energy from the energy devices to the seamless energy surface. Once energy has been delivered to the seamless energy surface with the requisite energy location density, the energy can be propagated in accordance with a 4D plenoptic function through a disclosed energy waveguide system. As will be appreciated by one of ordinary skill in the art, a 4D plenoptic function is well known in the art and will not be elaborated further herein.

The energy waveguide system selectively propagates energy through a plurality of energy locations along the seamless energy surface representing the spatial coordinate of the 4D plenoptic function with a structure configured to alter an angular direction of the energy waves passing through representing the angular component of the 4D plenoptic function, wherein the energy waves propagated may converge in space in accordance with a plurality of propagation paths directed by the 4D plenoptic function.

Figure 6:
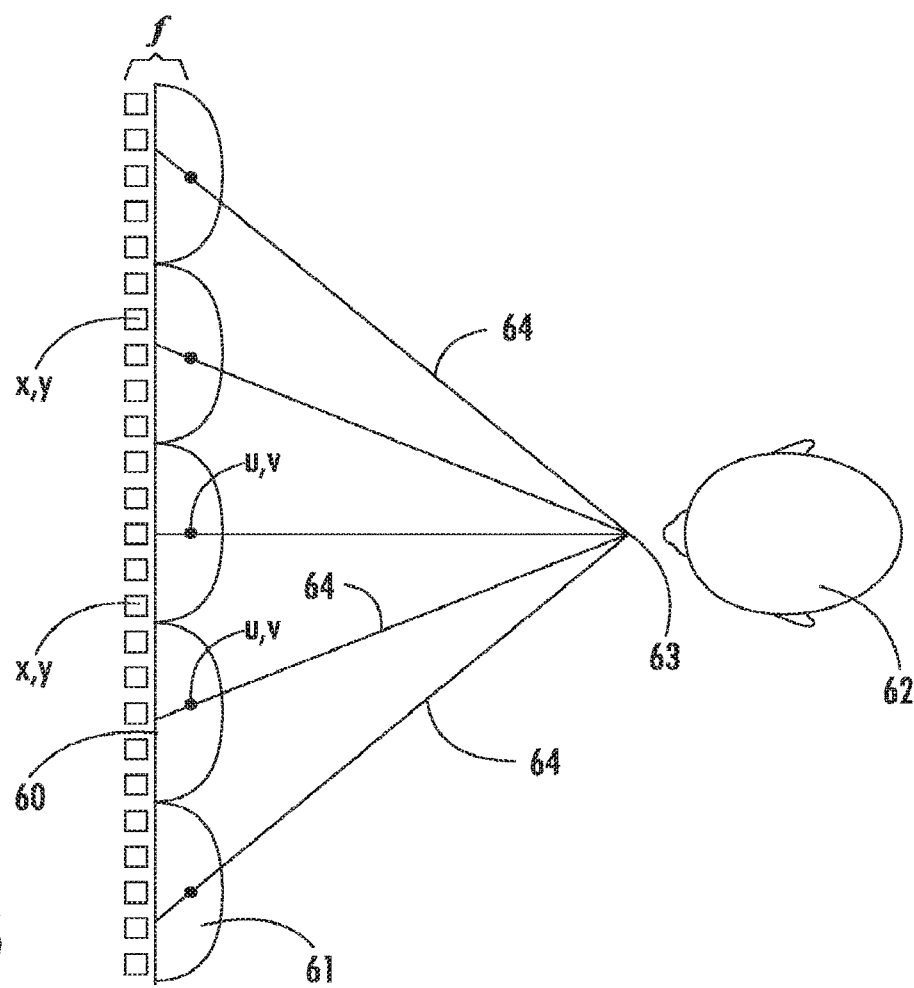
FIG. 6 is a schematic diagram showing rays propagated from an energy surface to a viewer.

Reference is now made to FIG. 6 illustrating an example of light field energy surface in 4D image space in accordance with a 4D plenoptic function. The figure shows ray traces of an energy surface 600 to a viewer 620 in describing how the rays of energy converge in space 630 from various positions within the viewing volume. As shown, each waveguide element 610 defines four dimensions of information describing energy propagation 640 through the energy surface 600. Two spatial dimensions (herein referred to as x and y) are the physical plurality of energy locations that can be viewed in image space, and the angular components theta and phi (herein referred to as u and v), which is viewed in virtual space when projected through the energy waveguide array. In general, and in accordance with a 4D plenoptic function, the plurality of waveguides (e.g., lenslets) are able to direct an energy location from the x, y dimension to a unique location in virtual space, along a direction defined by the u, v angular component, in forming the holographic or light field system described herein.

However, one skilled in the art will understand that a significant challenge to light field and holographic display technologies arises from uncontrolled propagation of energy due designs that have not accurately accounted for any of diffraction, scatter, diffusion, angular direction, calibration, focus, collimation, curvature, uniformity, element crosstalk, as well as a multitude of other parameters that contribute to decreased effective resolution as well as an inability to accurately converge energy with sufficient fidelity.

In an embodiment, an approach to selective energy propagation for addressing challenges associated with holographic display may include energy inhibiting elements and substantially filling waveguide apertures with near-collimated energy into an environment defined by a 4D plenoptic function.

In an embodiment, an array of energy waveguides may define a plurality of energy propagation paths for each waveguide element configured to extend through and substantially fill the waveguide element's effective aperture in unique directions defined by a prescribed 4D function to a plurality of energy locations along a seamless energy surface inhibited by one or more elements positioned to limit propagation of each energy location to only pass through a single waveguide element.

In an embodiment, multiple energy domains may be configured within a single, or between multiple energy waveguides to direct one or more sensory holographic energy propagations including visual, acoustic, tactile or other energy domains.

In an embodiment, the energy waveguides and seamless energy surface are configured to both receive and emit one or more energy domains to provide bi-directional energy propagation throughout the system.

In an embodiment, the energy waveguides are configured to propagate non-linear or non-regular distributions of energy, including non-transmitting void regions, leveraging digitally encoded, diffractive, refractive, reflective, grin, holographic, Fresnel, or the like waveguide configurations for any seamless energy surface orientation including wall, table, floor, ceiling, room, or other geometry based environments. In an additional embodiment, an energy waveguide element may be configured to produce various geometries that provide any surface profile and/or tabletop viewing allowing users to view holographic imagery from all around the energy surface in a 360-degree configuration.

In an embodiment, the energy waveguide array elements may be reflective surfaces and the arrangement of the elements may be hexagonal, square, irregular, semi-regular, curved, non-planar, spherical, cylindrical, tilted regular, tilted irregular, spatially varying and/or multilayered.

For any component within the seamless energy surface, waveguide, or relay components may include, but not limited to, optical fiber, silicon, glass, polymer, optical relays, diffractive, holographic, refractive, or reflective elements, optical face plates, energy combiners, beam splitters, prisms, polarization elements, spatial light modulators, active pixels, liquid crystal cells, transparent displays, or any similar materials exhibiting Anderson localization or total internal reflection.

Realizing the Holodeck

Aggregation of Bi-Directional Seamless Energy Surface Systems to Stimulate Human Sensory Receptors within Holographic Environments It is possible to construct large-scale environments of seamless energy surface systems by tiling, fusing, bonding, attaching, and/or stitching multiple seamless energy surfaces together forming arbitrary sizes, shapes, contours or form-factors including entire rooms. Each energy surface system may comprise an assembly having a base structure, energy surface, relays, waveguide, devices, and electronics, collectively configured for bi-directional holographic energy propagation, emission, reflection, or sensing.

In an embodiment, an environment of tiled seamless energy waveguide relay systems are aggregated to form large seamless planar or curved walls including installations comprising up to all surfaces in a given environment, and configured as any combination of seamless, discontinuous planar, faceted, curved, cylindrical, spherical, geometric, or non-regular geometries.

In an embodiment, aggregated tiles of planar surfaces form wall-sized systems for theatrical or venue-based holographic entertainment. In an embodiment, aggregated tiles of planar surfaces cover a room with four to six walls including both ceiling and floor for cave-based holographic installations. In an embodiment, aggregated tiles of curved surfaces produce a cylindrical seamless environment for immersive holographic installations. In an embodiment, aggregated tiles of seamless spherical surfaces form a holographic dome for immersive Holodeck-based experiences.

In an embodiment, aggregated tiles of seamless curved energy waveguides provide mechanical edges following the precise pattern along the boundary of energy inhibiting elements within the energy waveguide structure to bond, align, or fuse the adjacent tiled mechanical edges of the adjacent waveguide surfaces, resulting in a modular and seamless energy waveguide system.

In a further embodiment of an aggregated tiled environment, energy is propagated bi-directionally for multiple simultaneous energy domains. In an additional embodiment, the energy surface provides the ability to both display and capture simultaneously from the same energy surface with waveguides designed such that light field data may be projected by an illumination source through the waveguide and simultaneously received through the same energy surface. In an additional embodiment, additional depth sensing and active scanning technologies may be leveraged to allow for the interaction between the energy propagation and the viewer in correct world coordinates. In an additional embodiment, the energy surface and waveguide are operable to emit, reflect or converge frequencies to induce tactile sensation or volumetric haptic feedback. In some embodiments, any combination of bi-directional energy propagation and aggregated surfaces are possible.

In an embodiment, the system comprises an energy waveguide capable of bi-directional emission and sensing of energy through the energy surface with one or more energy devices independently paired with two-or-more-path energy combiners to pair at least two energy devices to the same portion of the seamless energy surface, or one or more energy devices are secured behind the energy surface, proximate to an additional component secured to the base structure, or to a location in front and outside of the FOV of the waveguide for off-axis direct or reflective projection or sensing, and the resulting energy surface provides for bi-directional transmission of energy allowing the waveguide to converge energy, a first device to emit energy and a second device to sense energy, and where the information is processed to perform computer vision related tasks including, but not limited to, 4D plenoptic eye and retinal tracking or sensing of interference within propagated energy patterns, depth estimation, proximity, motion tracking, image, color, or sound formation, or other energy frequency analysis. In an additional embodiment, the tracked positions actively calculate and modify positions of energy based upon the interference between the bi-directional captured data and projection information.

In some embodiments, a plurality of combinations of three energy devices comprising an ultrasonic sensor, a visible electromagnetic display, and an ultrasonic emitting device are configured together for each of three first relay surfaces propagating energy combined into a single second energy relay surface with each of the three first surfaces comprising engineered properties specific to each device's energy domain, and two engineered waveguide elements configured for ultrasonic and electromagnetic energy respectively to provide the ability to direct and converge each device's energy independently and substantially unaffected by the other waveguide elements that are configured for a separate energy domain.

In some embodiments, disclosed is a calibration procedure to enable efficient manufacturing to remove system artifacts and produce a geometric mapping of the resultant energy surface for use with encoding/decoding technologies as well as dedicated integrated systems for the conversion of data into calibrated information appropriate for energy propagation based upon the calibrated configuration files.

In some embodiments, additional energy waveguides in series and one or more energy devices may be integrated into a system to produce opaque holographic pixels.

In some embodiments, additional waveguide elements may be integrated comprising energy inhibiting elements, beam-splitters, prisms, active parallax barriers or polarization technologies in order to provide spatial and/or angular resolutions greater than the diameter of the waveguide or for other super-resolution purposes.

In some embodiments, the disclosed energy waveguide relay system may also be configured as a wearable bi-directional device, such as virtual reality (VR) or augmented reality (AR). In other embodiments, the energy waveguide relay system may include adjustment optical element(s) that cause the displayed or received energy to be focused proximate to a determined plane in space for a viewer. In some embodiments, the waveguide array may be incorporated to holographic head-mounted-display. In other embodiments, the system may include multiple optical paths to allow for the viewer to see both the energy waveguide relay system and a real-world environment (e.g., transparent holographic display). In these instances, the system may be presented as near field in addition to other methods.

In some embodiments, the transmission of data comprises encoding processes with selectable or variable compression ratios that receive an arbitrary dataset of information and metadata; analyze said dataset and receive or assign material properties, vectors, surface IDs, new pixel data forming a more sparse dataset, and wherein the received data may comprise: 2D, stereoscopic, multi-view, metadata, light field, holographic, geometry, vectors or vectorized metadata, and an encoder/decoder may provide the ability to convert the data in real-time or off-line comprising image processing for: 2D; 2D plus depth, metadata or other vectorized information; stereoscopic, stereoscopic plus depth, metadata or other vectorized information; multi-view; multi-view plus depth, metadata or other vectorized information; holographic; or light field content; through depth estimation algorithms, with or without depth metadata; and an inverse ray tracing methodology appropriately maps the resulting converted data produced by inverse ray tracing from the various 2D, stereoscopic, multi-view, volumetric, light field or holographic data into real world coordinates through a characterized 4D plenoptic function. In these embodiments, the total data transmission desired may be multiple orders of magnitudes less transmitted information than the raw light field dataset.

Plenoptic Opacity Modulation Through Transparent Waveguide Arrays

Although much of this disclosure pertains to enabling a sensory holographic experience, a disclosed intermediate step comprises the integration between virtual and augmented reality devices to significantly limit data and processing requirements for the simultaneous propagation and rasterization of a complete sensory holographic dataset. With other contemporary VR and AR technologies, the lack of modulated opacity states, resolution, and field of view dramatically limits the acuity of the sensory experience.

As an alternative, a novel transparent waveguide relay system capable of holographic convergence of modulated opacity states superimposed over real-world environments are disclosed. A direct view bidirectional energy waveguide relay design capable of transmission of real world data with overlaid light field modulated attenuation of digital and real world illumination comprises HMD, holographic, sensory energy propagation, as well as traditional display applications. The energy waveguide relay design comprises multiple energy waveguides and energy modulation elements where there is a first pair and a second pair that may be separated by two focal lengths. The two pairs may be placed two focal lengths apart as well. The transparent energy waveguide pairs may be placed in front of the eye to relay external energy uninhibited or attenuated by opacity modulation, or at a visible location at a predetermined distance and may include additional waveguide elements. The rays from the second pair furthest from the eye relays an inverted propagation path and the introduction of an additional pair of energy waveguides at this distance rectifies these rays to the once again appropriate ray directionality. The 4D plenoptic function in combination with a plurality of energy modulating devices provides for the propagation of holographic near field or far field digital information over real world coordinates with true 4D opacity and other modulated electromagnetic or sensory energies.

Figure 7:
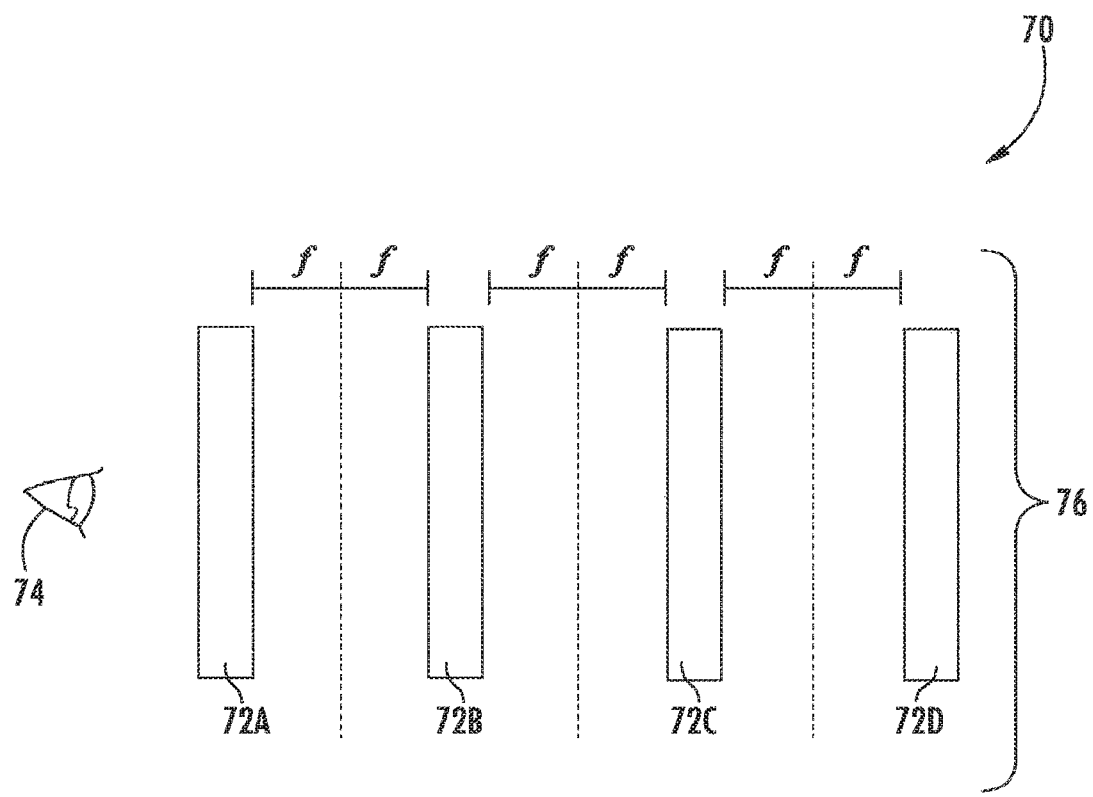
FIG. 7 illustrates an orthogonal view of an optical relay system consisting of multiple energy waveguide pairs, in accordance with one embodiment of the present disclosure.

FIG. 7 illustrates an orthogonal view of a waveguide relay system 70 consisting of multiple energy waveguide pairs 72A, 72B, 72C, 72D, in accordance with one embodiment of the present disclosure. As shown in FIG. 7, each energy waveguide pair may be a focal length f apart and may be viewed from the left, at the location of a viewer's eye 74, to the right 76, or vice versa. In some embodiments, additional waveguide elements, fewer waveguide elements and various separations are envisioned within the scope of this disclosure and the specified embodiments should not be considered limiting in any way.

In one embodiment, the waveguide relay system 70 may include: a first energy waveguide relay system 72A, 72B configured such that energy passing therethrough is directed according to a first 4D plenoptic function; a second energy waveguide relay system 72C, 72D following the first energy waveguide relay system 72A, 72B, the second energy waveguide relay system 72C, 72D configured such that energy passing therethrough is directed according to a second 4D plenoptic function, the second 4D plenoptic function inverse of the first 4D plenoptic function.

Figure 10:
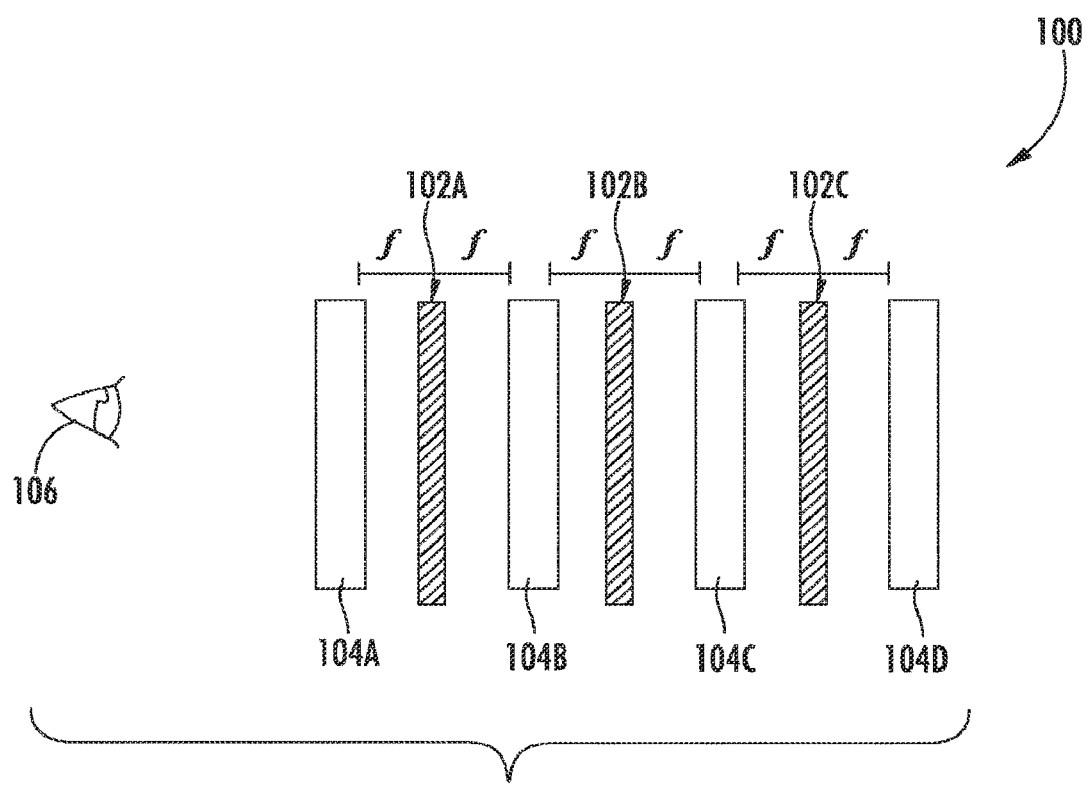
FIG. 10 illustrates an orthogonal view of a planar approach relative locations of each of three potential displays in reference to energy waveguide pairs, in accordance with one embodiment of the present disclosure.

In one embodiment, the system 70 includes a first energy modulation element (e.g., 102A, 102B, 102C as best shown in FIGS. 10 and 11) disposed in a first location in the first energy waveguide relay system 72A, 72B, in a second location in the second energy waveguide relay system 72C, 72D or in a third location in between the first energy waveguide relay system 72A, 72B and the second energy waveguide relay system 72C, 72D, the first energy modulation element configured to modulate energy passing therethrough. This will be described in more detail in subsequent figures and discussion.

In some embodiments, the first energy waveguide relay system 72A, 72B includes a first array of energy waveguides configured to direct energy therethrough along a plurality of energy propagation paths, where the energy waveguides of the first array are located at different spatial coordinates, and where each energy waveguide directs energy from the respective spatial coordinate to the plurality of energy propagation paths along different directions according to the first 4D plenoptic function.

In other embodiments, the second energy waveguide relay system 72C, 72D includes a second array of energy waveguides configured to direct energy therethrough along a plurality of energy propagation paths, where the energy waveguides of the second array are located at different spatial coordinates, and each energy waveguide directs energy from the respective spatial coordinate to the plurality of energy propagation paths along different directions according to the second 4D plenoptic function.

In one embodiment, the system 70 further includes a second energy modulation element (e.g., 102A, 102B, 102C as best shown in FIGS. 10 and 11) located in one of the first, second, or third location, the second energy modulation element configured to modulate energy passing therethrough. In one embodiment, the first and second energy modulation elements are located at the same location. In another embodiment, the first and second energy modulation elements are located at different locations. This, too, will be described in more detail in subsequent figures and discussion.

In one embodiment, the system further includes third energy modulation element (e.g., 102A, 102B, 102C as best shown in FIGS. 10 and 11) located in one of the first, second, or third location, the third energy modulation element configured to modulate energy passing therethrough. In some embodiments, the third energy modulation elements and at least one of the first and second energy modulation elements are located at the same location. This, too, will be described in more detail in subsequent figures and discussion.

In one embodiment, the first, second, and third energy modulation elements (e.g., 102A, 102B, 102C as best shown in FIGS. 10 and 11) are located at the same location. In another embodiment, the first, second, and third energy modulation elements (e.g., 102A, 102B, 102C as best shown in FIGS. 10 and 11) are located at different locations.

In some embodiments, each of the first, second and third energy modulation elements (e.g., 102A, 102B, 102C as best shown in FIGS. 10 and 11) include LCD, LED, DLP, OLED, LCOS, quantum dot, or other suitable energy modulating elements. In another embodiment, at least one of the first energy waveguide relay system 72A, 72B and the second energy waveguide relay system 72C, 72D is curved. In yet another embodiment, both the first energy waveguide relay system 72A, 72B and the second energy waveguide relay system 72C, 72D are curved. This, too, will be described in more detail in subsequent figures and discussion.

An additional embodiment of this fundamental approach provides tilted waveguides that optimize energy propagation quality as viewed by the eye. This may be implemented, but not limited to, regionally varying function, gradient based tilting, additional energy inhibiting elements, diffractive properties, refraction, reflection, gradient index, holographic optics, or the like, and/or may be incorporated into any potential designs above or below. A spatially varying energy waveguide design provides two or more regions with defined waveguide parameters to optimize for a specified design for the eye. The gradient-based function involves the generation of varying waveguide optimizations for each element.

Figure 8:
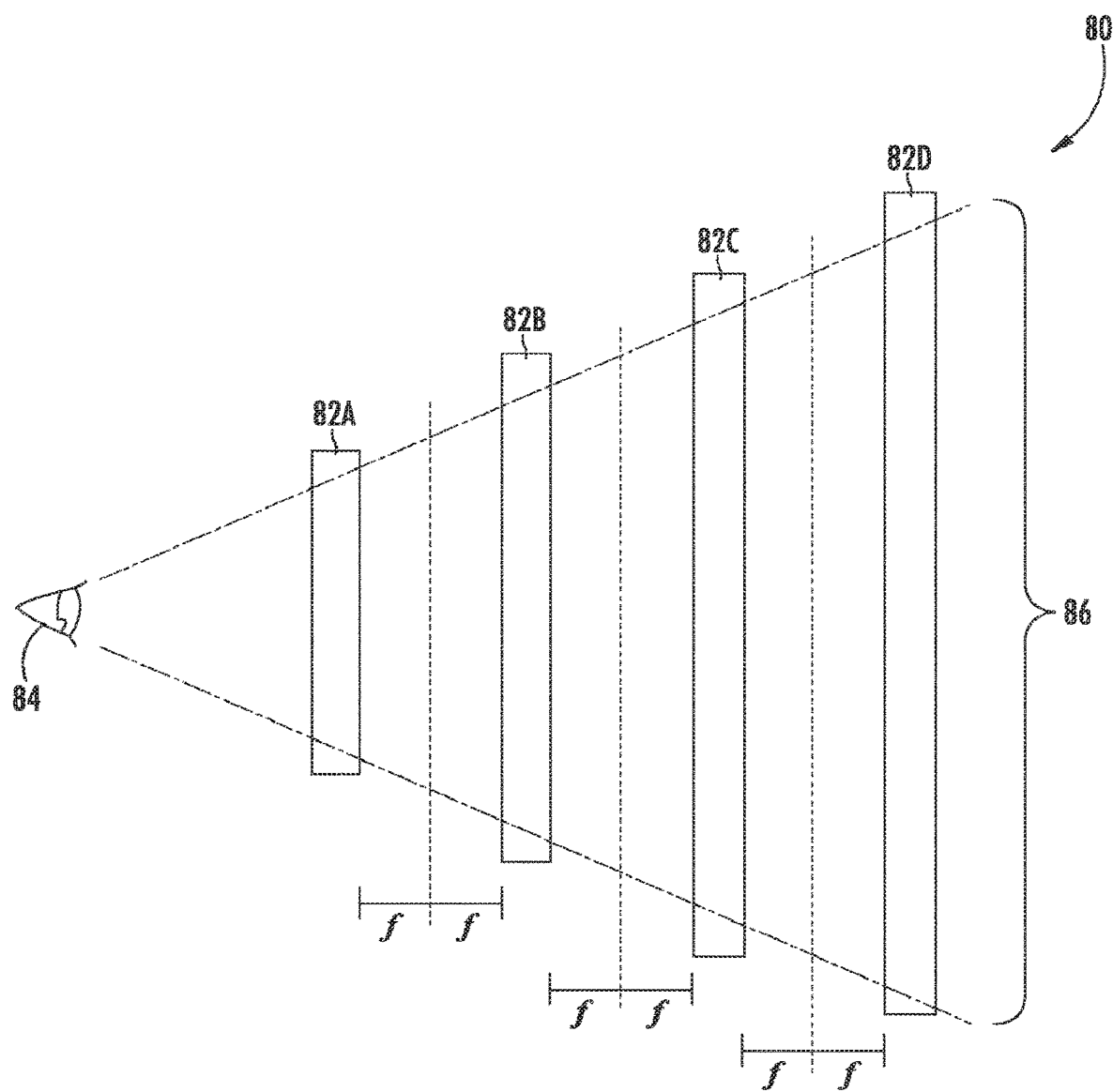
FIG. 8 illustrates an orthogonal view of an increasing size of each energy waveguide pair to account for the scaling of the field of view from the eye relative to the distance from the eye, in accordance with one embodiment of the present disclosure.

FIG. 8 illustrates an orthogonal view of a waveguide relay system 80 with increasing size of each energy waveguide pair 82A, 82B, 82C, 82D to account for the scaling of the field of view from the eye 84 relative to the distance from the eye 84, in accordance with one embodiment of the present disclosure. This embodiment provides for greater waveguiding efficiency to provide propagation functions more normal to the aperture of the visual system thereby more efficiently targeting a field of view of the eye 84 through each element within the system 86.

Like above, the waveguide relay system 80 may include: a first energy waveguide relay system 82A, 82B configured such that energy passing therethrough is directed according to a first 4D plenoptic function; a second energy waveguide relay system 82C, 82D following the first energy waveguide relay system 82A, 82B, the second energy waveguide relay system 82C, 82D configured such that energy passing therethrough is directed according to a second 4D plenoptic function, the second 4D plenoptic function inverse of the first 4D plenoptic function.

In one embodiment, a first energy modulation element (e.g., 102A, 102B, 102C as best shown in FIGS. 10 and 11) may be disposed in a first location in the first energy waveguide relay system 82A, 82B, in a second location in the second energy waveguide relay system 82C, 82D or in a third location in between the first energy waveguide relay system 82A, 82B and the second energy waveguide relay system 82C, 82D, the first energy modulation element configured to modulate energy passing therethrough. This will be described in more detail in subsequent figures and discussion.

In another embodiment, a second energy modulation element (e.g., 102A, 102B, 102C as best shown in FIGS. 10 and 11) may be located in one of the first, second, or third location, the second energy modulation element configured to modulate energy passing therethrough.

In another embodiment, the first energy waveguide relay system 82A, 82B may include a first array of energy waveguides configured to direct energy therethrough along a plurality of energy propagation paths, where the energy waveguides of the first array are located at different spatial coordinates, and each energy waveguide directs energy from the respective spatial coordinate to the plurality of energy propagation paths along different directions according to the first 4D plenoptic function.

In yet another embodiment, the second energy waveguide relay system 82C, 82D may include a second array of energy waveguides configured to direct energy therethrough along a plurality of energy propagation paths, where the energy waveguides of the second array are located at different spatial coordinates, and each energy waveguide directs energy from the respective spatial coordinate to the plurality of energy propagation paths along different directions according to the second 4D plenoptic function.

In one embodiment, the first and second energy modulation elements (e.g., 102A, 102B, 102C as best shown in FIGS. 10 and 11) are located at the same location. In another embodiment, the first and second energy modulation elements are located at different locations.

In some embodiments, the system 80 may further include a third energy modulation element (e.g., 102A, 102B, 102C as best shown in FIGS. 10 and 11) located in one of the first, second, or third location, the third energy modulation element configured to modulate energy passing therethrough. In one embodiment, the third energy modulation elements and at least one of the first and second energy modulation elements are located at the same location. In some embodiments, the first, second, and third energy modulation elements are located at the same location. In other embodiments, the first, second, and third energy modulation elements are located at different locations. In some embodiments, each of the first, second and third energy modulation elements includes LCD, LED, DLP, OLED, LCOS, quantum dot, or other energy modulation elements. In another embodiment, at least one of the first energy waveguide relay system and the second energy waveguide relay system is curved. In yet another embodiment, both the first energy waveguide relay system and the second energy waveguide relay system are curved. These embodiments will be described in more detail in subsequent figures and discussion.

Figure 9:
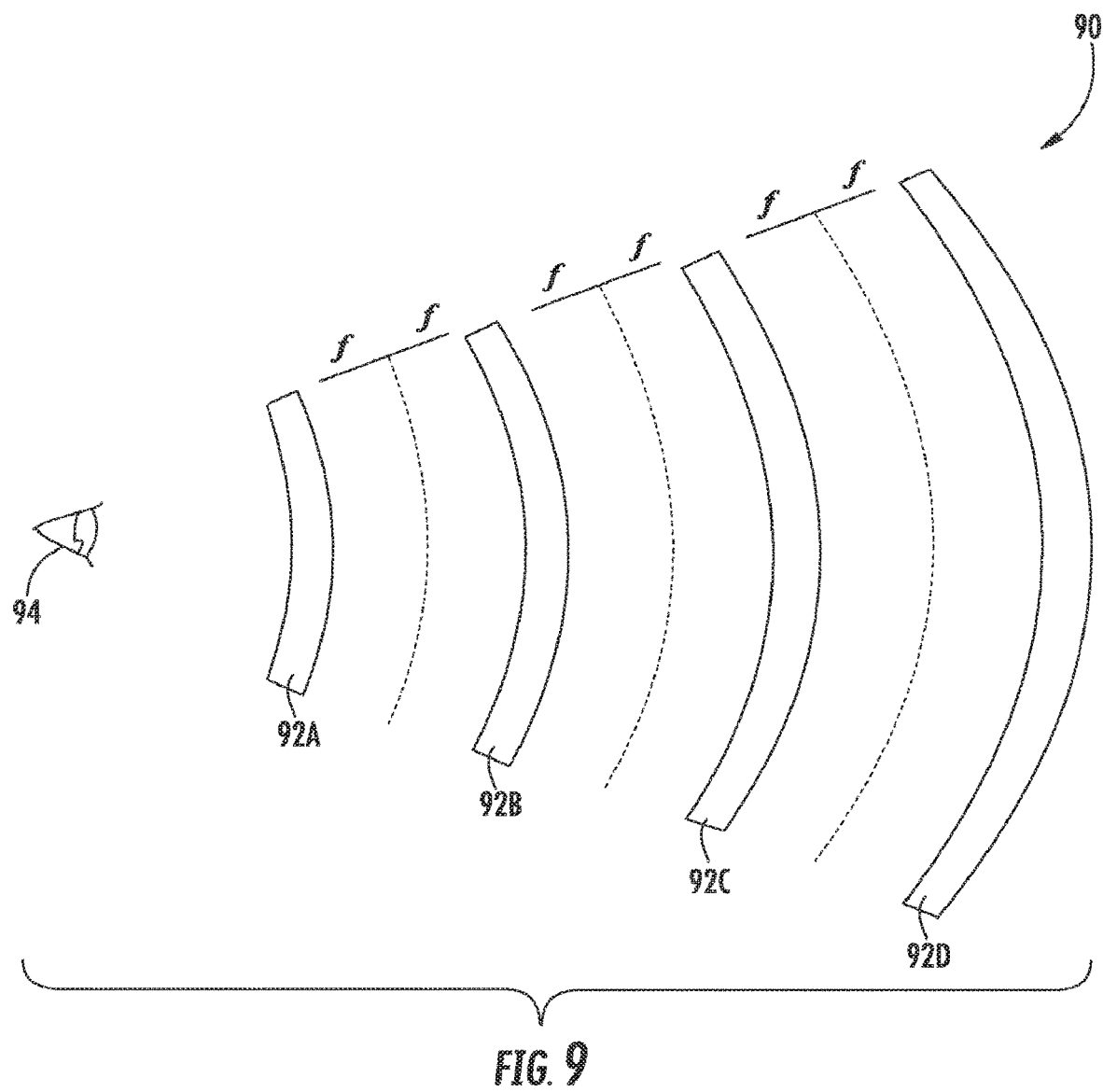
FIG. 9 illustrates an orthogonal view of energy waveguides that are both scaled and cylindrically radiating about the rotational axis of the eye, in accordance with one embodiment of the present disclosure.

FIG. 9 illustrates an orthogonal view of a waveguide relay system 90 of energy waveguides 92A, 92B, 92C, 92D that are both scaled and cylindrically radiating about the rotational axis of the eye, in accordance with one embodiment of the present disclosure. In this embodiment, the energy waveguides 92A, 928, 92C, 92D are curved to account for the rotational axis of a viewer's eye 94. This may be implemented as non-scaled or as a scaled and curved design. This curved design may be implemented as a horizontally or vertically cylindrical shape or may be formed as a concave or spherical shape. Use of this approach may increase the perceived clarity of the rays presented through the relay system 90 to the eye 94. It should also be noted that a cylindrical or spherical approach provides greater efficiency of the number of angular samples per waveguide as the normal of each waveguide are more correctly oriented towards the entrance pupil of the eye 94, thereby more efficiently mimicking natural energy propagation rather than planar functions that propagate rays off axis for the periphery of the field of view of the eye 94.

As depicted in FIG. 9, at least one of the first energy waveguide relay system 92A, 92B and the second energy waveguide relay system 92C, 92D may be curved. Although both energy waveguide relay systems 92 are shown to be curved, it will be appreciated by one skilled in the art that in one embodiment the first energy waveguide relay system 92A, 92B may be curved and the second energy waveguide relay system 92C, 92D may be planar. In an alternative embodiment, the first energy waveguide relay system 92A, 92B may be planar while the second energy waveguide relay system 92C, 92D may be curved. The curving of the energy waveguide relay systems 92 may similarly be applied to all the systems (e.g., FIGS. 7, 8 and 10-12) disclosed herein.

Like above, in one embodiment, the system 90 may include: a first energy waveguide relay system 92A, 92B configured such that energy passing therethrough is directed according to a first 4D plenoptic function; a second energy waveguide relay system 92C, 92D following the first energy waveguide relay system 92A, 92B, the second energy waveguide relay system 92C, 92D configured such that energy passing therethrough is directed according to a second 4D plenoptic function, the second 4D plenoptic function inverse of the first 4D plenoptic function.

In another embodiment, a first energy modulation element (e.g., 102A, 102B, 102C as best shown in FIGS. 10 and 11) may be disposed in a first location in the first energy waveguide relay system 92A, 92B, in a second location in the second energy waveguide relay system 92C, 92D or in a third location in between the first energy waveguide relay system 92A, 92B and the second energy waveguide relay system 92C, 92D, the first energy modulation element configured to modulate energy passing therethrough. This will be described in more detail in subsequent figures and discussion.

In yet another embodiment, a second energy modulation element (e.g., 102A, 102B, 102C as best shown in FIGS. 10 and 11) may be located in one of the first, second, or third location, the second energy modulation element configured to modulate energy passing therethrough, and a third energy modulation element (e.g., 102A, 1028, 102C as best shown in FIGS. 10 and 11) may be located in one of the first, second, or third location, the third energy modulation element configured to modulate energy passing therethrough. This will be described in more detail in subsequent figures and discussion.

In one embodiment, the first energy waveguide relay system 92A, 92B includes a first array of energy waveguides configured to direct energy therethrough along a plurality of energy propagation paths, where the energy waveguides of the first array are located at different spatial coordinates, and each energy waveguide directs energy from the respective spatial coordinate to the plurality of energy propagation paths along different directions according to the first 4D plenoptic function.

In another embodiment, the second energy waveguide relay system 92C, 92D includes a second array of energy waveguides configured to direct energy therethrough along a plurality of energy propagation paths, where the energy waveguides of the second array are located at different spatial coordinates, and each energy waveguide directs energy from the respective spatial coordinate to the plurality of energy propagation paths along different directions according to the second 4D plenoptic function.

In one embodiment, the first and second energy modulation elements (e.g., 102A, 102B, 102C as best shown in FIGS. 10 and 11) may be located at the same location. In another embodiment, the first and second energy modulation elements may be located at different locations. In some embodiments, the third energy modulation elements and at least one of the first and second energy modulation elements may be located at the same location. In other embodiments, the first, second, and third energy modulation elements may be located at the same location. In yet some other embodiments, the first, second, and third energy modulation elements may be located at different locations. In some embodiments, each of the first, second and third energy modulation elements includes LCD, LED, DLP, OLED, LCOS, quantum dot, or other suitable energy modulating elements. These embodiments will be described in more detail in subsequent figures and discussion.

FIG. 10 illustrates an orthogonal view of a waveguide relay system 100 showing the relative locations of each of three potential energy modulation devices 102A, 102B, 102C in relation to energy waveguides 104A, 104B, 104C, 104D, in accordance with one embodiment of the present disclosure. In one embodiment, each pair of energy waveguides (e.g., 104A and 104B or 104C and 104D) may be configured to form an energy waveguide relay system.

In order to overlay a virtual light field onto the real world requires the integration of a plurality of energy propagation paths as viewed through the above-mentioned energy waveguide relay configurations. Relay of energy waveguides with three energy devices (transparent OLED 102A, transparent LCD 102B, and transparent OLED 102C, provided for exemplary purposes only), enables true convergence of holographic opacity through the transmissive light field energy directing relay. In some embodiments, the explicit reference to a specific type of display technology is for exemplary purposes only and not intended to limit the disclosure in any way. A pairing of the three specially mentioned (but not limited to) energy modulation devices 102A, 102B, 102C placed at or about the focal length in between each of the pairs of energy waveguides 104A, 104B, 104C, 104D, plus at the focal length f from a viewer's eye 106 between the pairs 104A, 104B, 104C, 104D, the ability for the digital superimposition of variable light field opacity and transmissive states for any range of energies within a specified energy domain.

In an embodiment, a first energy modulation device may comprise structures for volumetric spectral modulation of opaque energy propagations in an active state. Spectral modulation may additionally be propagated through combination of other energy modulation device pairs 102A, 102C. The specific modulation devices 102A, 102C may provide precise control over propagation of saturation and transparency. For the purposes of this filing, the addition of all three energy modulation devices 102A, 102B, 102C may or may not be used—only one energy modulation device is needed for energy propagation. Designs may be implemented in any combination, specifically referring to previous embodiments comprising planar waveguiding systems, curved, scaled, variable approaches as disclosed depending on the specific application.

As depicted in FIG. 10, the system 100 may comprise a first energy waveguide relay system 104A, 104B configured such that energy passing therethrough is directed according to a first 4D plenoptic function and a second energy waveguide relay system 104C, 104D following the first energy waveguide relay system 104A, 102A, 104B, the second energy waveguide relay system 104C, 102C, 104D configured such that energy passing therethrough is directed according to a second 4D plenoptic function, the second 4D plenoptic function inverse of the first 4D plenoptic function.

As depicted in FIG. 10, a first modulation element 102A may be an LCD, LED, DLP, OLED, LCOS, quantum dot, or other suitable energy modulating elements. The system may include a second modulation element 102B and a third modulation element 102C similar to that of the first modulation element 102A.

In one embodiment, a first energy modulation element 102A may be disposed in the first energy waveguide relay system 104A, 104B while a second energy modulation element 102B may be disposed in between the first energy waveguide relay system 104A, 104B and the second energy waveguide relay system 104C, 104D. A third energy modulation element 102C may be disposed in the second energy waveguide relay system 104C, 104D. In this embodiment, each of the first, second and third energy modulation elements 102A, 102B, 102C may be configured to modulate energy passing therethrough.

Although the first modulation element 102A is shown to be in the first energy waveguide relay system 104A, 104B, the second modulation element 102B is shown to be in between the first energy waveguide relay system 104A, 104B and the second energy waveguide relay system 104C, 104D, and the third modulation element 102C is shown to be in the second energy waveguide relay system 104C, 104D, it will be understood that the modulation elements 102A, 102B, 102C can be located anywhere throughout the system 100. For example, all three modulation elements 102 may be located in the first energy waveguide relay system 104A, 104B. In another embodiment, all three modulation elements 102 may be located in the second energy 104C, 104D. In yet another embodiment, all three modulation elements 102 may be located in between the first energy waveguide relay system 104A, 104B and the second energy waveguide relay system 104C, 104D. It will be understood by one of ordinary skill in the art that various combinations and permutations may be utilized. In some embodiments, the system 100 may further include four or five or as many modulation elements 102 depending on the application.

Like that of FIG. 9, the first energy waveguide relay system 104A, 104B may be curved in one embodiment. In another embodiment, the second energy waveguide relay system 104C, 104D may be curved. In yet another embodiment, both the first energy waveguide relay system 104A, 104B and the second energy waveguide relay system 104C, 104D may be curved. It will be appreciated by one skilled in the art that although two energy waveguide relay systems 104 are shown, there can be three or four or many more energy waveguide relay systems 104 as necessary depending on the application. Furthermore, one or two or any number of these energy waveguide relay systems 104 may or may not be curved.

In one embodiment, the transparent display system 100 includes: a first energy waveguide relay system 104A, 104B configured such that energy passing therethrough is directed according to a first 4D plenoptic function; a second energy waveguide relay system 104C, 104D following the first energy waveguide relay system 104A, 104B, the second energy waveguide relay system 104C, 104D configured such that energy passing therethrough is directed according to a second 4D plenoptic function, the second 4D plenoptic function inverse of the first 4D plenoptic function. In this embodiment, a first energy modulation element 102A is disposed in the first energy waveguide relay system 104A, 104B; a second energy modulation element 102B is disposed in between the first energy waveguide relay system 104A, 104B and the second energy waveguide relay system 104C, 104D; and a third energy modulation element 102C is disposed in the second energy waveguide relay system 104C, 104D, where the first, second and third energy modulation elements 102A, 102B, 102C are configured to modulate energy passing therethrough.

In one embodiment, the first energy waveguide relay system 104A, 104B may include a first array of energy waveguides configured to direct energy therethrough along a plurality of energy propagation paths, wherein the energy waveguides of the first array are located at different spatial coordinates, and each energy waveguide directs energy from the respective spatial coordinate to the plurality of energy propagation paths along different directions according to the first 4D plenoptic function.

In another embodiment, the second energy waveguide relay system 104C, 104D may include a second array of energy waveguides configured to direct energy therethrough along a plurality of energy propagation paths, wherein the energy waveguides of the second array are located at different spatial coordinates, and each energy waveguide directs energy from the respective spatial coordinate to the plurality of energy propagation paths along different directions according to the second 4D plenoptic function.

In some embodiments, the system 100 may further include one or more additional energy modulation elements (not shown) located in one of the first, second, or third locations, the one or more additional energy modulation elements configured to modulate energy passing therethrough. The first location may be within the first energy waveguide relay system 104A, 104B, the second location may be between the first energy waveguide relay system 104A, 104B and the second energy waveguide relay system 104C, 104D, and the third location may be within the second energy waveguide relay system 104C, 104D. In some embodiments, the one or more additional energy modulation elements (not shown) and at least one of the first, second and third energy modulation elements 102 may be located at the same location. In other embodiments, the one or more additional energy modulation elements (not shown) and at least one of the first, second and third energy modulation elements 102 may be located at different locations.

In an embodiment, three energy modulation elements 102 cumulatively propagate electromagnetic energies, comprising modulated amalgams for color, transparency, intensity, opacity and a plurality of other holographic conditions. Table 1 is presented for reference of a few variable opacity and transmissive states for a plurality of spectral values and the commensurate exemplary value each of the three energy modulation elements would exhibit.

TABLE 1

|  | First Modulation Element (102A) [OLED] | Second Modulation Element (102B) [LCD] | Third Modulation Element (102C) [OLED] |
| --- | --- | --- | --- |
| Opaque Black | Off | On | Off or On |
| Transparent Black | Off | Off | Off |
| Opaque Red | Red Only On | On or Off | Off |
| Transparent Red | Red Only X % | Off | Red Only Y % |
| Opaque Grey | On X % | On | Off |
| Transparent Grey | On X % | Off | On Y % |

Table 1 illustrates a matrix of potential color values for each of the respective modulation elements in the relay system to produce volumetric rays that include all color, intensity, transparency and opacity in full light field projection.

Values that indicate on or off a referring to the potential for either configuration depending on the efficiency of the modulation system to absorb electromagnetic radiation in a configuration. For values that indicate X or Y percent, this is due to the need to determine the efficiency of energy modulation device 102A aggregated through energy modulation device 102C to produce the effective and desired holographic opacity and spectral energy propagation. Y may be off or may be some percent of the total transmission desired.

In some embodiments, the modulation of the energy waveguide relay systems comprise all sensory energy domains, and wherein the energy modulation devices may comprise other forms of sensory energy devices to include visual, auditory, gustatory, olfactory, somatosensory or other sensory systems as disclosed. Further, the scope of this system comprises bidirectional capabilities between and through the energy propagating waveguide relay system to be leveraged for additional embodiments comprising any such disclosures relating to the directing of holographic or sensory energy. In an embodiment, the energy relay system is designed as a bidirectional large format energy directing device having both modulation and other energy devices to enable transparent and holographic superimposition of sensory energies through the waveguiding relay system, and wherein the systems may appear invisible through the transparent system, and may comprise energy sensors or any combination of sensory energy propagation, holodeck parameters, interactivity or otherwise leveraged for other applications not disclosed explicitly within this application.

It should be noted that this approach provides the ability to truly "paint" black or opaque values in volumetric space wherein the plurality of modulation devices and waveguiding systems induces convergence of energy propagations paths such that the projected coordinate in space comprise the properties of real world objects. In an embodiment, interactivity, volumetric masking or other novel applications may be leveraged outside of the disclosed embodiments. This novel approach to recreate real world reflectance points from a near field, augmented, virtual or other head mounted display, is a significant leap in immersive qualities and provides a greater sense of realism not possible with other approaches.

As shown in FIG. 10 and disclosed in Table 1, a first energy modulation element may include white opacity, and a second energy modulation element may include an additional opacity or color, and the third energy modulation element may include black opacity. In an embodiment, first and third energy modulation elements may both be OLEDs 102A, 102C and the second energy modulation element may be an LCD 102B such that to present an opaque black color the first modulation element is configured to an off state, the second modulation element is configured to an on state, and the third modulation element can be configured to an on state or an off state.

Figure 13:
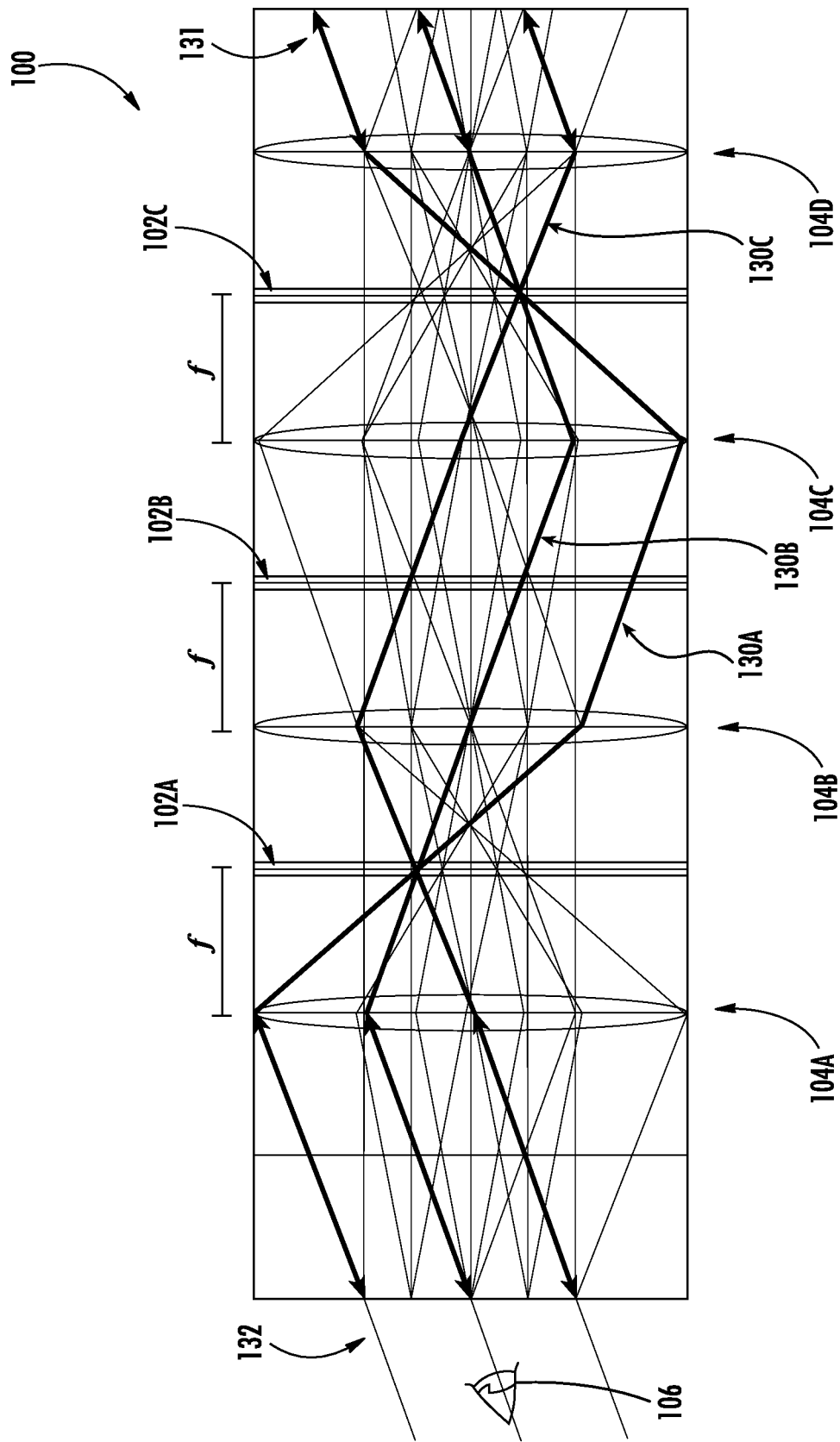
FIG. 13 illustrates an orthogonal view of ray propagation paths along a collection of individual elements within a waveguide relay system having multiple energy waveguide relay pairs, in accordance with one embodiment of the present disclosure.

FIG. 13 illustrates a single energy waveguide relay element system 100, wherein a single effective collection of four waveguide element functions comprising waveguide relay element pair 104A, 104B and 104C, 104D provide for efficient energy propagation. Within the subset of propagated energy waves, 130A, 130B, 130C, the functions prescribed by the energy waveguides when guided by a 4D function, allows for the accurate convergence for given ray bundles propagating along the system, wherein, the knowledge of energy domain, frequency, or other environmental parameters provides for both the projection and sensing of energy in accordance with a 4D function.

In reference to Table 1 and in consideration of FIG. 13, one skilled in the art will appreciate the method to converge modulated states through 102A, 102B, 102C thereby intersecting propagation paths 130A, 130B, 130C wherein the energy entering the system adjacent to waveguide element 104D at location 131 may propagate bidirectionally through the system. In the event that energy propagates through the system from location 131 to a viewed position 106, the energy waves propagating throughout the waveguide functions 104A, 104B, 104C, 104D and energy modulating devices 102A, 102B, 102C, exit with a direction that is substantially similar between entry paths 131 and exit paths 132. For viewed rays and superimposed information generated by energy modulating elements 102A, 102B, and 102C from a viewed location 106 and propagating along 132, the bidirectional propagation of energy remains substantially similar throughout the energy waveguide relay system though location 131.

In this fashion, it is possible to propagate the information through the transparent waveguide relay system wherein the viewer 106 may receive energy 132 from 131 substantially unmodified from the original energy waves when modulation elements 102A, 102B, and 102C in the absence of modulation. However, upon activation of the energy modulation devices guided by 4D functions provides the ability to propagate converging 4D plenoptic opacity states, such that the apparent differential between a truly opaque object and a superimposed virtual object may be indistinguishable with sufficient calibration and maturation of the technology.

In an embodiment, first and third energy modulation element are both OLEDs 102A, 102C and the second energy modulation element may be an LCD 102B such that to present a transparent black color the first modulation element is configured to an off state, the second modulation element is configured to an off state, and the third modulation element is configured to an off state.

In an embodiment, first and third energy modulation elements are both OLEDs 102A, 102C and the second energy modulation element may be an LCD 102B such that to present an opaque red color the first modulation element is configured to a red only on state, the second modulation element can be configured to an on state or an off state, and the third modulation element is configured to an off state.

In an embodiment, first and third energy modulation elements are both OLEDs 102A, 102C and the second energy modulation element may be an LCD 102B such that to present a transparent red color the first modulation element is configured to a red only state at a first percentage, the second modulation element is configured to an off state, and the third modulation element is configured to a red only state at a second percentage, the second percentage different than the first percentage.

In an embodiment, first and third energy modulation elements are both OLEDs 102A, 102C and the second energy modulation element may be an LCD 102B such that to present an opaque grey color the first modulation element is configured to an on state at a first percentage, the second modulation element is configured to an on state, and the third modulation element is configured to an off state.

In an embodiment, first and third energy modulation elements are both OLEDs 102A, 102C and the second energy modulation element may be an LCD 1028 such that to present a transparent grey color the first modulation element is configured to an on state at a first percentage, the second modulation element is configured to an off state, and the third modulation element is configured to an on state at a second percentage, the second percentage different than the first percentage.

In some embodiments, the present disclosures may be implemented for any size type explicitly to include displays that are not head mounted in any way. In this fashion, it is possible to "paint" transparency values with any form of light field, including visual or other sensory display systems, leveraging the method and systems presented herein.

In an embodiment for manufacturing efficiency, an additional embodiment proposes to bond together either energy modulation element 102A and 102E or 102C and 102B. This helps increase the efficiency of calibration and solve a number of mechanical alignment challenges.

Figure 11A:
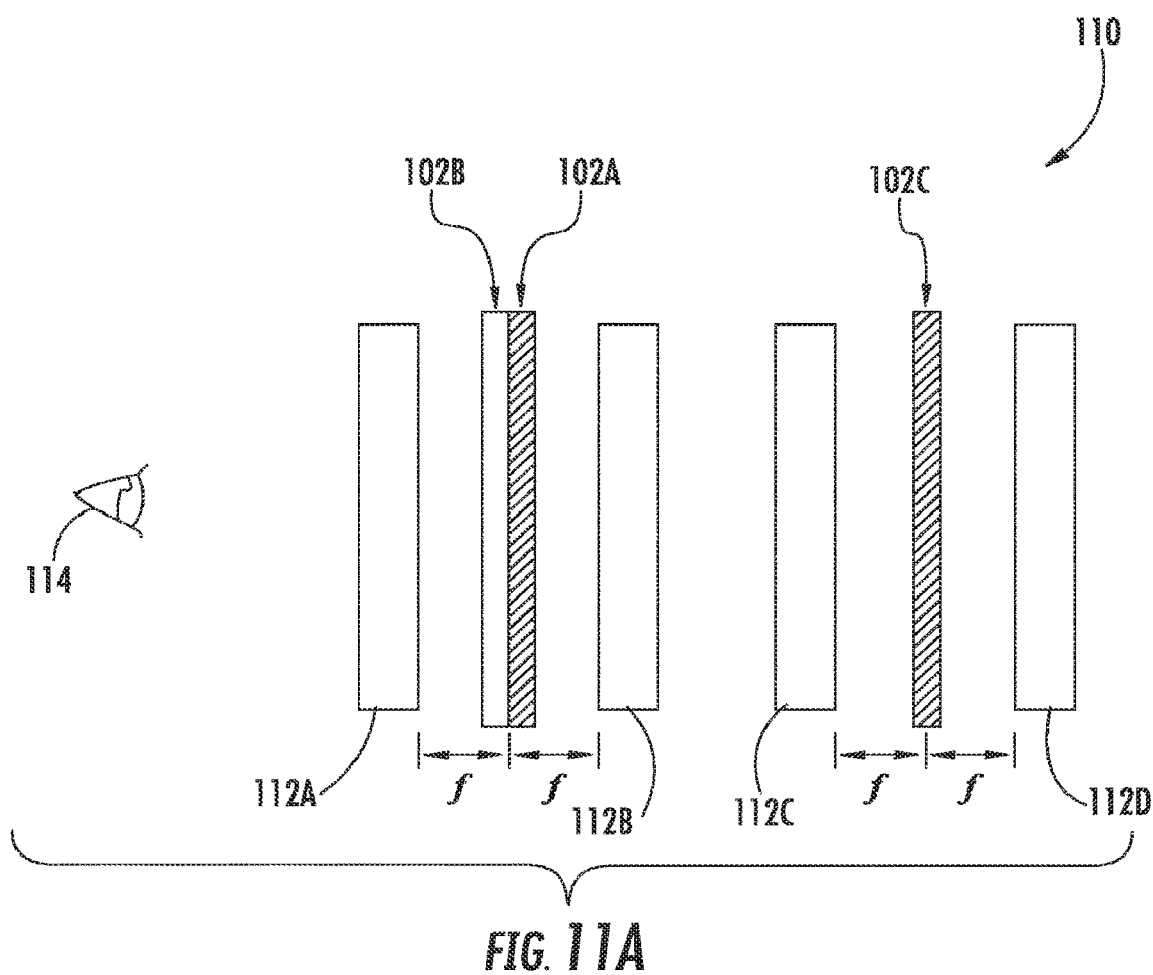
FIG. 11A illustrates an orthogonal view of a configurations to bond two displays together to increase manufacturing and calibration efficiency, in accordance with one embodiment of the present disclosure.
Figure 11B:
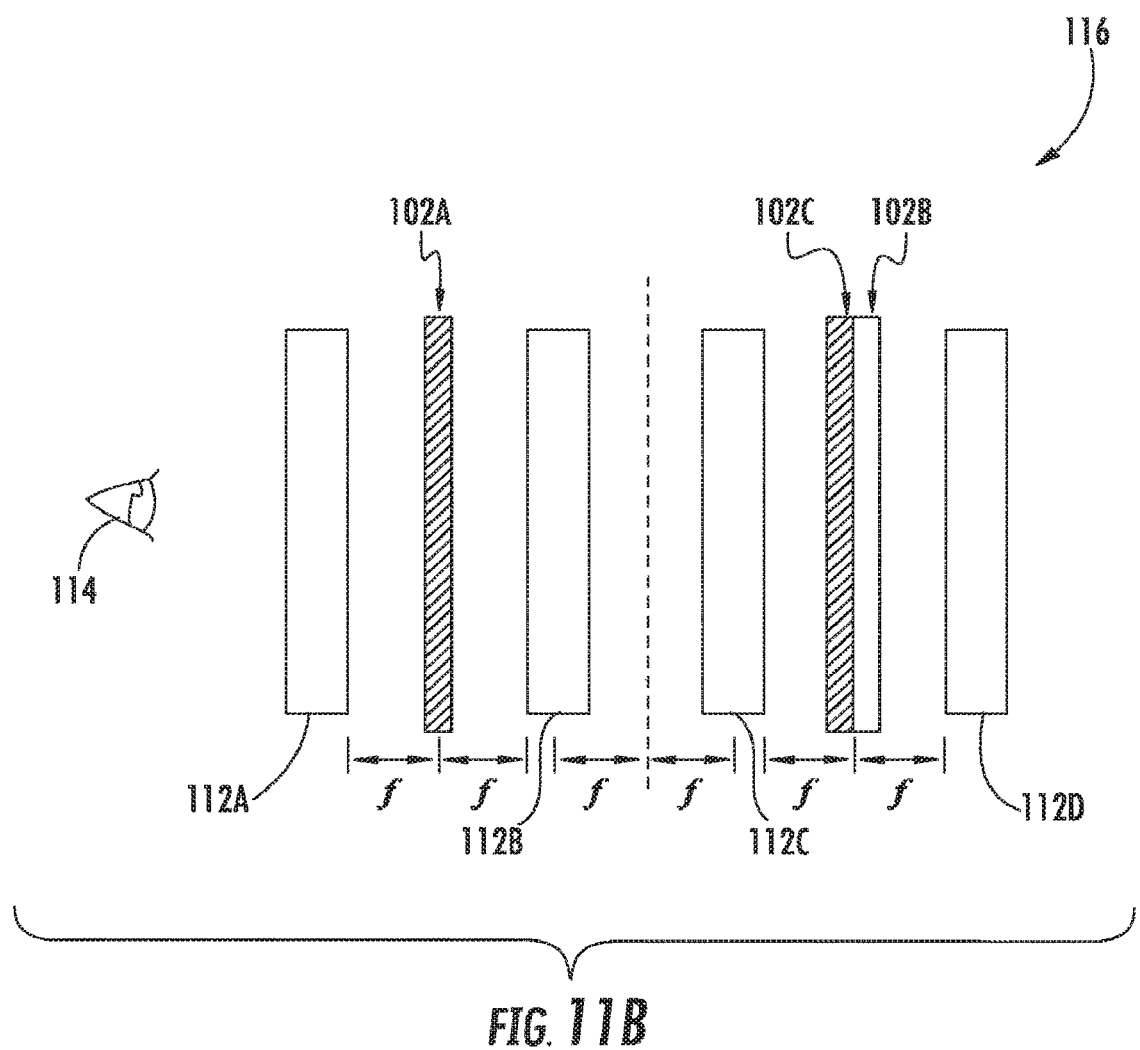
FIG. 11B illustrates an orthogonal view of a configurations to bond two displays together to increase manufacturing and calibration efficiency, in accordance with one embodiment of the present disclosure.

FIG. 11A illustrates an orthogonal view of a configuration 110 to bond two energy modulation elements 102A, 102B together to increase manufacturing and calibration efficiency, in accordance with one embodiment of the present disclosure. FIG. 11B illustrates an orthogonal view of a configuration 116 to bond two energy modulation elements 102B, 102C together to increase manufacturing and calibration efficiency, in accordance with one embodiment of the present disclosure.

As depicted in FIGS. 11A and 11B, in an embodiment, the system 110 (FIG. 11A) or 116 (FIG. 11B) may include a first energy waveguide relay system 112A, 112B configured such that energy passing therethrough is directed according to a first 4D plenoptic function and a second energy waveguide relay system 112C, 112D following the first energy waveguide relay system 112A, 112B, the second energy waveguide relay system 112C, 112D configured such that energy passing therethrough is directed according to a second 4D plenoptic function, the second 4D plenoptic function inverse of the first 4D plenoptic function.

In one embodiment, the system 110 may include an OLED modulation element 102A, a LCD modulation element 102B, and another OLED modulation element 102C, and any combinations thereof. As shown in FIG. 11A, the OLED modulation element 102A and the LCD modulation element 102B may be located in the first energy waveguide relay system 112A, 112E while the OLED modulation element 102C may be located in the second energy waveguide relay system 112C, 112D. Conversely, as shown in FIG. 11B, the OLED modulation element 102A may be located in the first energy waveguide relay system 112A, 112B while the LCD modulation element 102B and the OLED modulation element 102C are located in the second energy waveguide relay system 112C, 112D. It will be appreciated by one skilled in the art that the modulation elements 102 maybe randomly distributed throughout the energy waveguide relay systems 112.

In an embodiment, a first energy modulation element may be disposed in a first location in the first energy waveguide relay system, in a second location in the second energy waveguide relay system or in a third location in between the first energy waveguide relay system and the second energy waveguide relay system, with the first energy modulation element configured to modulate energy passing therethrough. In another embodiment, a second energy modulation element may be located in one of the first, second, or third locations, with the second energy modulation element configured to modulate energy passing therethrough. In yet another embodiment, a third energy modulation element may be located in one of the first, second, or third locations, with the second energy modulation element configured to modulate energy passing therethrough. In one example, the third energy modulation element may be located at the same location of at least one of the first and second energy modulation elements. In another example, the third energy modulation element may be located at different locations from the at least one of the first and second energy modulation elements.

In one embodiment, the first energy waveguide relay system 112A, 112B may include a first array of energy waveguides configured to direct energy therethrough along a plurality of energy propagation paths, wherein the energy waveguides of the first array are located at different spatial coordinates, and each energy waveguide directs energy from the respective spatial coordinate to the plurality of energy propagation paths along different directions according to the first 4D plenoptic function. The second energy waveguide relay system may include a second array of energy waveguides configured to direct energy therethrough along a plurality of energy propagation paths, wherein the energy waveguides of the second array are located at different spatial coordinates, and each energy waveguide directs energy from the respective spatial coordinate to the plurality of energy propagation paths along different directions according to the second 4D plenoptic function.

The second energy modulation element may be located in one of the first, second, or third locations, with the second energy modulation element configured to modulate energy passing therethrough. In an embodiment, the first and second energy modulation elements are located at the same location, but the first and second energy modulation elements may also be located at different locations.

In some embodiments, a third energy modulation element may be located in one of the first, second, or third locations, the third energy modulation element configured to modulate energy passing therethrough. In an embodiment, the third energy modulation elements and at least one of the first and second energy modulation elements are located at the same location, while in other embodiments, the first, second, and third energy modulation elements are located at the same location or different locations.

An additional embodiment provides the ability to manufacturer the energy waveguide relay optics through a multi-step wafer level bonding process. Due to the resolution requirements of near field display and the high pixel densities required, and approach similar to other disclosures discussed within this application for encoded energy waveguides for holographic super resolution may be additionally leveraged, with a sophisticated modification to the energy waveguide relay design. With high refresh rate synchronous energy modulation elements, two additional higher density energy waveguides are implemented at the center of each of the two original energy waveguide pairs. The ratio of the increased density may be the result of:

$$D^2 = Nn/Nc$$

where D is the increased density ratio needed (squared for X and Y respectively), Nn is the new quantity of angular samples per waveguide element desired, and Nc is the current system angular samples value without the super resolution applied. For example, if the current sampling provided 9 samples along X in the current system, and 27 are desired, the density increase would be a factor of $3x^2$.

In order to determine the number of time sequential samples that are required:

$$FPSn = FPSs * D^2$$

where FPSn is the resulting required frame rate, FPSs is the native content frame rate and $D^2$ is the ratio calculated from above. For example, if the source content frame rate is 24 fps and $D^2$ equals 9, the new sampling frequency may comprise 216 fps.

Figure 12:
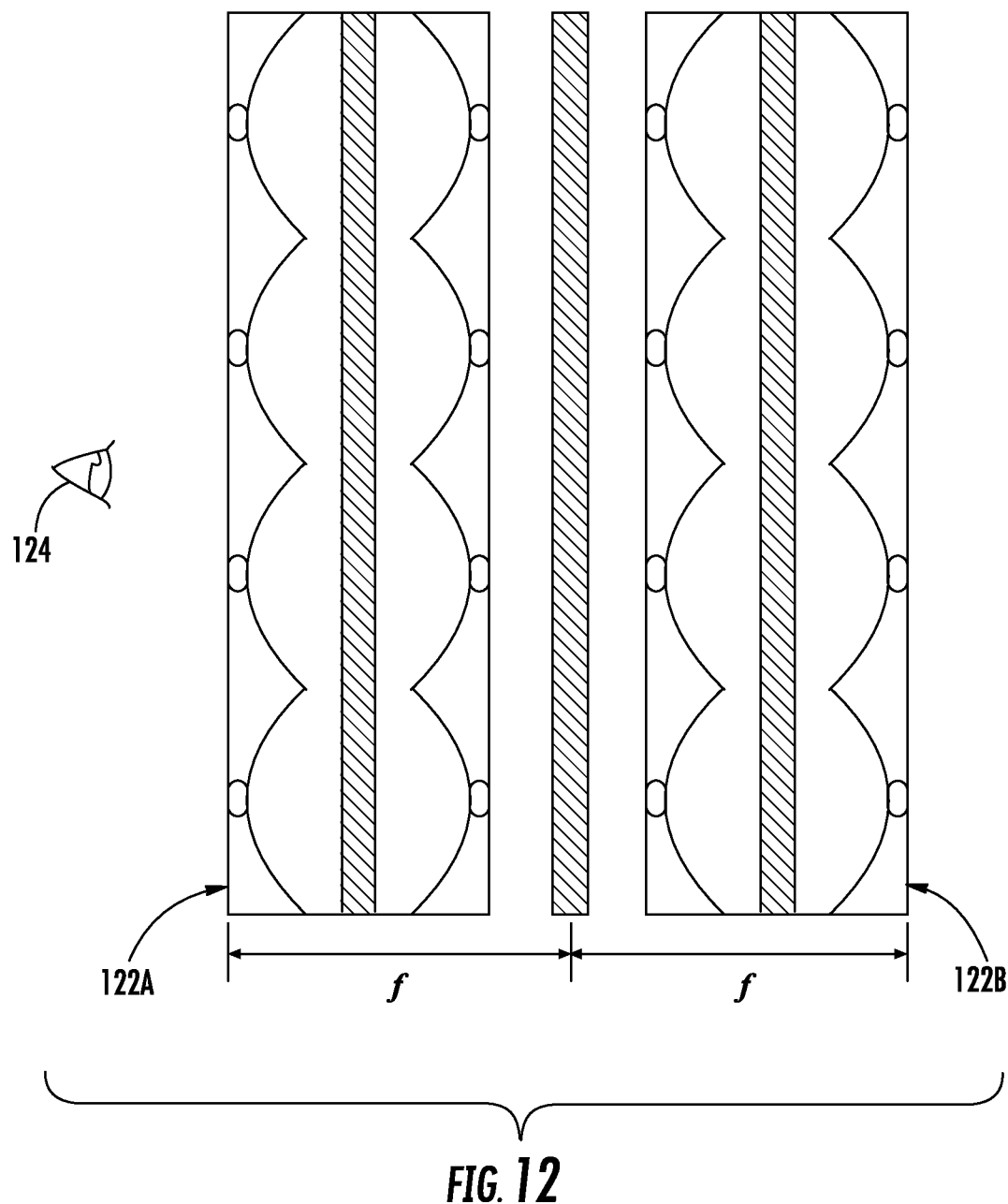
FIG. 12 illustrates an orthogonal view of an alternative to a volumetric opacity generating display that directly inverts the rays of light such that one or more elements from system may be removed, in accordance with one embodiment of the present disclosure.

FIG. 12 illustrates an orthogonal view of an alternative system 120 to the waveguide relay system that directly inverts the rays of light such that one or more elements from system may be removed, in accordance with one embodiment of the present disclosure. This system 120 may implement a hardware modification wherein leveraging a reflective waveguide relay system 122A, 122B provides a direct inversion of every presented propagation path to a viewer's eye 124. This may further be advantageous for the any of HMD systems or opacity generating devices such that waveguide relays may be removed from the overall system.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Field of Invention," such claims should not be limited by the language under this heading to describe the so-called technical field. Further, a description of technology in the "Background of the Invention" section is not to be construed as an admission that technology is prior art to any invention (s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. In general, but subject to the preceding discussion, a numerical value herein that is modified by a word of approximation such as "about" may vary from the stated value by at least ±1, 2, 3, 4, 5, 6, 7, 10, 12 or 15%.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "near," "proximate to," and "adjacent to" shall mean sufficiently close to have a material effect upon the respective system element interactions. Other words of approximation similarly refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature.

The term "or combinations thereof" as used herein refers to all permutations and combinations of the listed items preceding the term. For example, A, B, C, or combinations thereof is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. A system comprising:
    a first energy waveguide system configured such that energy passing therethrough is directed according to a first 4D plenoptic function;
    a second energy waveguide system following the first energy waveguide system, the second energy waveguide system configured such that energy passing therethrough is directed according to a second 4D plenoptic function, the second 4D plenoptic function inverse of the first 4D plenoptic function; and
    a first energy modulation element disposed in a first location in the first energy waveguide system, in a second location in the second energy waveguide system or in a third location in between the first energy waveguide system and the second energy waveguide system, the first energy modulation element configured to modulate a first energy passing therethrough, wherein the first energy comprises energy entered through the first energy waveguide system from outside the first energy waveguide system and energy emitted withing the first energy waveguide system;
    wherein the first energy modulation element is operable to selectively modulate external energy received by the system from a first external location on a first side of the system, and the first and second energy waveguide relay systems are operable to propagate, based on the first and second 4D plenoptic functions, respectively, the external energy from the first external location on the first side of the system to a second external location on a second side of the system; and
    wherein the first energy modulation element is operable to generate energy to be perceived, by a viewer at the second external location on the second side of the system, as being superimposed with the external energy at the first external location on the first side of the system.

2. The system of claim 1, wherein the first energy waveguide system includes a first array of energy waveguides configured to direct energy therethrough along a plurality of energy propagation paths, wherein the energy waveguides of the first array are located at different spatial coordinates, and each energy waveguide directs energy from the respective spatial coordinate to the plurality of energy propagation paths along different directions according to the first 4D plenoptic function.

3. The system of claim 1, wherein the second energy waveguide system includes a second array of energy waveguides configured to direct energy therethrough along a plurality of energy propagation paths, wherein the energy waveguides of the second array are located at different spatial coordinates, and each energy waveguide directs energy from the respective spatial coordinate to the plurality of energy propagation paths along different directions according to the second 4D plenoptic function.

4. The system of claim 1, further comprising a second energy modulation element located in one of the first, second, or third location, the second energy modulation element configured to modulate energy passing therethrough.

5. The system of claim 4, wherein the first and second energy modulation elements are located at the same location.

6. The system of claim 4, wherein the first and second energy modulation elements are located at different locations.

7. The system of claim 4, further comprising a third energy modulation element located in one of the first, second, or third location, the third energy modulation element configured to modulate energy passing therethrough.

8. The system of claim 7, wherein the third energy modulation elements and at least one of the first and second energy modulation elements are located at the same location.

9. The system of claim 7, wherein the first, second, and third energy modulation elements are located at the same location.

10. The system of claim 7, wherein the first, second, and third energy modulation elements are located at different locations.

11. The system of claim 7, wherein each of the first, second and third energy modulation elements include LCD, LED, DLP, OLED, LCOS, and quantum dot.

12. The system of claim 1, wherein at least one of the first energy waveguide system and the second energy waveguide system is curved.

13. The system of claim 1, wherein both the first energy waveguide system and the second energy waveguide system are curved.

14. A system comprising:
a first energy waveguide system configured such that energy passing therethrough is directed according to a first 4D plenoptic function;
a second energy waveguide system following the first energy waveguide system, the second energy waveguide system configured such that energy passing therethrough is directed according to a second 4D plenoptic function, the second 4D plenoptic function inverse of the first 4D plenoptic function;
a first energy modulation element disposed in a first location in the first energy waveguide system, in a second location in the second energy waveguide system or in a third location in between the first energy waveguide system and the second energy waveguide system, the first energy modulation element configured to modulate energy passing therethrough; and
a second energy modulation element located in one of the first, second, or third location, the second energy modulation element configured to modulate energy passing therethrough;
wherein the first energy modulation element is operable to selectively modulate external energy received by the system from a first external location on a first side of the system, and the first and second energy waveguide relay systems are operable to propagate, based on the first and second 4D plenoptic functions, respectively, the external energy from the first external location on the first side of the system to a second external location on a second side of the system; and
wherein the first energy modulation element is operable to generate energy to be perceived, by a viewer at the second external location on the second side of the system, as being superimposed with the external energy at the first external location on the first side of the system.

15. The system of claim 14, wherein the first energy waveguide system includes a first array of energy waveguides configured to direct energy therethrough along a plurality of energy propagation paths, wherein the energy waveguides of the first array are located at different spatial coordinates, and each energy waveguide directs energy from the respective spatial coordinate to the plurality of energy propagation paths along different directions according to the first 4D plenoptic function.

16. The system of claim 14, wherein the second energy waveguide system includes a second array of energy waveguides configured to direct energy therethrough along a plurality of energy propagation paths, wherein the energy waveguides of the second array are located at different spatial coordinates, and each energy waveguide directs energy from the respective spatial coordinate to the plurality of energy propagation paths along different directions according to the second 4D plenoptic function.

17. The system of claim 14, wherein the first and second energy modulation elements are located at the same location.

18. The system of claim 14, wherein the first and second energy modulation elements are located at different locations.

19. The system of claim 14, further comprising a third energy modulation element located in one of the first, second, or third location, the third energy modulation element configured to modulate energy passing therethrough.

20. The system of claim 19, wherein the third energy modulation elements and at least one of the first and second energy modulation elements are located at the same location.

21. The system of claim 19, wherein the first, second, and third energy modulation elements are located at the same location.

22. The system of claim 19, wherein the first, second, and third energy modulation elements are located at different locations.

23. The system of claim 14, wherein at least one of the first energy waveguide system and the second energy waveguide system is curved.

24. The system of claim 14, wherein both the first energy waveguide system and the second energy waveguide system are curved.

* * * * *